(12) United States Patent
Willison et al.

(10) Patent No.: US 12,327,200 B2
(45) Date of Patent: Jun. 10, 2025

(54) SYSTEMS AND METHODS FOR MODELING A MANUFACTURING ASSEMBLY LINE

(71) Applicant: ATS Corporation, Cambridge (CA)

(72) Inventors: Nicholas Willison, Cambridge (CA); Mehdi Sadeghzadeh, Cambridge (CA); Masoud Kheradmandi, Cambridge (CA); Bo Yuan Chang, Cambridge (CA); Stephen Bacso, Cambridge (CA); Yang Wang, Cambridge (CA); Nick Foisy, Cambridge (CA); Stanley Kleinikkink, Cambridge (CA)

(73) Assignee: ATS Corporation, Cambridge (CA)

( * ) Notice: Subject to any disclaimer, the term of this patent is extended or adjusted under 35 U.S.C. 154(b) by 361 days.

(21) Appl. No.: 17/885,917

(22) Filed: Aug. 11, 2022

(65) Prior Publication Data

US 2023/0095827 A1    Mar. 30, 2023

Related U.S. Application Data

(63) Continuation of application No. 17/216,290, filed on Mar. 29, 2021, now Pat. No. 11,449,778.

(Continued)

(51) Int. Cl.
| | | |
|---|---|---|
| *G06N 5/04* | (2023.01) | |
| *G01M 99/00* | (2011.01) | |

(Continued)

(52) U.S. Cl.
CPC ............ *G06N 5/04* (2013.01); *G01M 99/005* (2013.01); *G05B 19/41805* (2013.01);

(Continued)

(58) Field of Classification Search
CPC ................ G05B 19/41885; G05B 2219/32194
See application file for complete search history.

(56) References Cited

U.S. PATENT DOCUMENTS

| | | |
|---|---|---|
| 6,687,561 B1 | 2/2004 | Pasadyn et al. |
| 2002/0128810 A1 | 9/2002 | Craig et al. |

(Continued)

FOREIGN PATENT DOCUMENTS

| | | |
|---|---|---|
| CN | 109791401 A | 5/2019 |
| EP | 0548777 A1 | 6/1993 |

OTHER PUBLICATIONS

Abdi, M. Reza, and A. W. Labib, "Grouping and selecting products: the design key of reconfigurable manufacturing systems (RMSs)." International journal of production research 42.3 (2004): 521-546. (Year: 2004).

(Continued)

*Primary Examiner* — Nathan L Laughlin

(57) ABSTRACT

Various systems and methods for modeling a manufacturing assembly line are disclosed herein. Some embodiments relate to operating a processor to receive cell data and line production data, determine one or more production associations between the cell data and the line production data; evaluate the one or more production associations to identify one or more critical production associations; retrieve the cell data and the line production data associated with the one or more critical production associations; and train a predictive model with the retrieved cell data and the retrieved line production data to predict the production level of the manufacturing assembly line.

18 Claims, 12 Drawing Sheets

Related U.S. Application Data

(60) Provisional application No. 63/002,916, filed on Mar. 31, 2020.

(51) Int. Cl.

| | | |
|---|---|---|
| *G05B 19/418* | (2006.01) | |
| *G05B 23/02* | (2006.01) | |
| *G06N 5/01* | (2023.01) | |
| *G06N 20/00* | (2019.01) | |

(52) U.S. Cl.
CPC ... *G05B 19/4183* (2013.01); *G05B 19/41865* (2013.01); *G05B 19/41885* (2013.01); *G05B 23/0267* (2013.01); *G06N 5/01* (2023.01); *G06N 20/00* (2019.01); *G05B 2219/32194* (2013.01)

(56) References Cited

U.S. PATENT DOCUMENTS

| | | |
|---|---|---|
| 2005/0033464 A1 | 2/2005 | Nguyen |
| 2005/0228511 A1 | 10/2005 | Das et al. |
| 2007/0208436 A1 | 9/2007 | Das et al. |
| 2008/0074247 A1 | 3/2008 | Plantamura |
| 2008/0140330 A1* | 6/2008 | Morioka ................ G05B 15/02 702/179 |
| 2009/0199045 A1 | 8/2009 | Kasubuchi et al. |
| 2009/0228247 A1 | 9/2009 | Hendler et al. |
| 2015/0235143 A1 | 8/2015 | Eder |
| 2015/0241511 A1* | 8/2015 | Bickford ................ H01L 22/20 702/117 |
| 2017/0206468 A1* | 7/2017 | Ghosh ................ G05B 23/0275 |
| 2017/0300041 A1 | 10/2017 | Onishi et al. |
| 2018/0081912 A1 | 3/2018 | Suleiman et al. |
| 2018/0083833 A1 | 3/2018 | Zoll et al. |
| 2018/0285831 A1 | 10/2018 | Meruva et al. |
| 2019/0163172 A1 | 5/2019 | Daniel et al. |
| 2019/0278261 A1 | 9/2019 | Shibuya |
| 2020/0183369 A1 | 6/2020 | Kumar |
| 2020/0293019 A1* | 9/2020 | Putman .................. G06N 3/006 |
| 2021/0247748 A1* | 8/2021 | Bhagavat ......... G05B 19/41805 |
| 2021/0263508 A1* | 8/2021 | Wang .................... G05B 17/02 |

OTHER PUBLICATIONS

International Search Report and Written Opinion, Canadian Intellectual Property Office, Jul. 2, 2021.

Extended European Search Report, European Patent Office, Oct. 17, 2022.

* cited by examiner

SYSTEMS AND METHODS FOR MODELING A MANUFACTURING ASSEMBLY LINE

CROSS-REFERENCE TO RELATED APPLICATIONS

This application is a continuation application of U.S. patent application Ser. No. 17/216,290 filed Mar. 29, 2021, which claims priority to U.S. Provisional Patent Application No. 63/002,916 filed Mar. 31, 2020 and titled "SYSTEM AND METHODS FOR MODELING A MANUFACTURING ASSEMBLY LINE", the contents of which are incorporated herein by reference for all purposes.

FIELD

The described embodiments relate to systems and methods for modeling manufacturing assembly lines, and to systems and methods for applying the predictive model to the manufacturing assembly line in various applications.

BACKGROUND

Manufacturing processes can involve processing (e.g., assembling, fabricating, treating, refining, etc.) raw materials or parts to produce products. During a manufacturing process, a partially-finished product may be referred to as a workpiece. Manufacturing processes can involve assembly lines in which a workpiece is successively processed to produce a final product. The workpiece can be moved through the assembly line to various machines that sequentially perform various processing on the workpiece. Modern manufacturing assembly lines can involve a large number of highly configurable machines that can produce complex final products. As a result, it can be difficult to monitor the operation of a manufacturing assembly line, and make any adjustments and/or repairs without affecting the overall production of the manufacturing assembly line.

SUMMARY

The various embodiments described herein generally relate to systems and methods for modeling a manufacturing assembly line. The disclosed systems and methods may relate to training models for predicting one or more properties of the manufacturing assembly line, such as a production level. The disclosed systems and methods may also relate to optimizing the configuration of a manufacturing assembly line or evaluating faults in a manufacturing assembly line.

In accordance with some embodiments, there is provided a method for generating a predictive model for predicting a production level of a manufacturing assembly line. The manufacturing assembly line includes a plurality of cells. Each cell is configured to successively process a workpiece along the manufacturing assembly line. The method involves operating a processor to: receive cell data associated with at least one cell during an operation of an active manufacturing assembly line, the cell data including, for each cell, at least one input state of that cell and a cell position of that cell within the active manufacturing assembly line; receive line production data associated with the cell data, the line production data being representative of a production level of the active manufacturing assembly line in association with the respective cell data; determine one or more production associations between the cell data of each cell and the production level of the active manufacturing assembly line; evaluate the one or more production associations to identify one or more critical production associations to the operation of the active manufacturing assembly line; retrieve the cell data and the line production data associated with the one or more critical production associations; and train the predictive model with the retrieved cell data and the retrieved line production data to predict the production level of the manufacturing assembly line.

In some embodiments, the line production data may be representative of a defect level of the active manufacturing assembly line, the one or more production associations may include one or more associations between the cell data of each cell and the defect level of the active manufacturing assembly line, and the predictive model may be trained to predict the defect level of the manufacturing assembly line.

In some embodiments, the one or more production associations may include a cell input association between an input state of a cell and the production level of the active manufacturing assembly line, and a cell position association between a cell position of a cell and the production level of the active manufacturing assembly line.

In some embodiments, evaluating the one or more production associations may involve identifying one or more one statistically significant production associations as the one or more critical production associations.

In some embodiments, identifying the one or more statistically significant production associations may involve: determining a probability value of each production association in the plurality of production associations being unassociated; and identifying a production association as the one of the one or more statistically significant associations if the probability value of that production association is less than or equal to a predetermined significance level.

In some embodiments, the cell data may include a cell position of a first cell relative to a second cell in the active manufacturing assembly line. The plurality of production associations may include a cell position association between the cell position of the first cell relative to the second cell and the production level of the active manufacturing assembly line.

In some embodiments, the first cell may be downstream of the second cell in the active manufacturing assembly line.

In some embodiments, the first cell may be upstream of the second cell in the active manufacturing assembly line.

In some embodiments, at least some of the cell data may correspond to a first time. At least some of the line production data may correspond to a second time later than the first time. The one or more production associations may include a production association between cell data corresponding to the first time and a production level corresponding to the second time.

In some embodiments, evaluating the one or more production associations may involve: identifying the production association between the cell data corresponding to the first time and the production level corresponding to the second time as one of the one or more critical production associations if a difference between the first time and the second time is less than a pre-determined time limit.

In some embodiments, the at least one input state may include a starved state in which the corresponding cell received an undersupply of at least one input for processing the workpiece.

In some embodiments, the predictive model may include a decision tree. The decision tree may include a plurality of nodes. Training the predictive model may involve generating at least one node corresponding to the one or more critical production associations.

In some embodiments, each cell may include at least one device configured to process the workpiece. The method may further involve operating the processor to receive device data associated with at least one device during the operation of the active manufacturing assembly line. The device data may include, for each device, at least one device state. The plurality of production associations may include an association between a device state and the production level of the active manufacturing assembly line.

In accordance with some embodiments, there is provided a non-transitory computer-readable medium including instructions executable on a processor for implementing the method.

In accordance with some embodiments, there is provided a system for generating a predictive model for predicting a production level of a manufacturing assembly line. The manufacturing assembly line includes a plurality of cells. Each cell is configured to successively process a workpiece along the manufacturing assembly line. The system includes a processor configured to: receive cell data associated with at least one cell during an operation of an active manufacturing assembly line, the cell data including, for each cell, at least one input state of that cell and a cell position of that cell within the active manufacturing assembly line; receive line production data associated with the cell data, the line production data being representative of a production level of the active manufacturing assembly line in association with the respective cell data; determine one or more production associations between the cell data of each cell and the production level of the active manufacturing assembly line; evaluate the one or more production associations to identify one or more critical production associations to the operation of the active manufacturing assembly line; retrieve the cell data and the line production data associated with the one or more critical production associations; and train the predictive model with the retrieved cell data and the retrieved line production data to predict the production level of the manufacturing assembly line.

In some embodiments, the line production data may be representative of a defect level of the active manufacturing assembly line, the one or more production associations may include one or more associations between the cell data of each cell and the defect level of the active manufacturing assembly line, and the predictive model may be trained to predict the defect level of the manufacturing assembly line.

In some embodiments, the one or more production associations may include a cell input association between an input state of a cell and the production level of the active manufacturing assembly line, and a cell position association between a cell position of a cell and the production level of the active manufacturing assembly line.

In some embodiments, the processor may be configured to identify one or more statistically significant production associations as the one or more critical production associations.

In some embodiments, the processor may be further configured to: determine a probability value of each production association in the plurality of production associations being unassociated; and identify a production association as the one of the one or more statistically significant associations if the probability value of that production association is less than or equal to a predetermined significance level.

In some embodiments, the cell data may include a cell position of a first cell relative to a second cell in the active manufacturing assembly line. The plurality of production associations may include a cell position association between the cell position of the first cell relative to the second cell and the production level of the active manufacturing assembly line.

In some embodiments, the first cell may be downstream of the second cell in the active manufacturing assembly line.

In some embodiments, the first cell may be upstream of the second cell in the active manufacturing assembly line.

In some embodiments, at least some of the cell data may correspond to a first time. At least some of the line production data may correspond to a second time later than the first time. The one or more production associations may include a production association between cell data corresponding to the first time and a production level corresponding to the second time.

In some embodiments, the processor is configured to: identify the production association between the cell data corresponding to the first time and the production level corresponding to the second time as one of the one or more critical production associations if a difference between the first time and the second time is less than a pre-determined time limit.

In some embodiments, the at least one input state may include a starved state in which the corresponding cell received an undersupply of at least one input for processing the workpiece.

In some embodiments, the predictive model may include a decision tree. The decision tree may include a plurality of nodes. The processor may be configured to generate at least one node corresponding to the one or more critical production associations.

In some embodiments, each cell may include at least one device configured to process the workpiece. The processor may be further configured to receive device data associated with at least one device during the operation of the active manufacturing assembly line. The device data may include, for each device, at least one device state. The plurality of production associations may include an association between a device state and the production level of the active manufacturing assembly line.

In accordance with some embodiments, there is provided a method for optimizing a manufacturing assembly line. The manufacturing assembly line includes a plurality of cells. Each cell is configured to successively process a workpiece along the manufacturing assembly line. The method involves operating a processor to: receive cell data associated with at least one cell of the manufacturing assembly line, the cell data including, for each cell, at least one input state of that cell and a cell position of that cell within the manufacturing assembly line; extract feature data from the cell data, the feature data including at least one input state and at least one cell position of at least one cell; determine a plurality of cell configurations, each cell configuration corresponding to one cell and defining a different process for processing the workpiece by that one cell; determine an efficiency score for each cell configuration by applying the extracted feature data to a predictive model generated for predicting a production level of the manufacturing assembly line; determine at least one target cell configuration from the plurality of cell configurations based on the efficiency score for each cell configuration; and apply the at least one target cell configuration to at least one cell by implementing each target cell configuration to a corresponding cell.

In some embodiments, determining the plurality of cell configurations may involve determining a plurality of cell configurations for one cell. Determining the at least one target cell configuration may involve determining one target cell configuration for that one cell by selecting a cell configuration with the highest efficiency score from the plurality of cell configurations for that one cell.

In some embodiments, determining the plurality of cell configurations may involve determining at least one cell configuration for each cell. Determining the at least one target cell configuration may involve determining a target cell configuration for each cell.

In some embodiments, determining the target cell configuration for each cell may involve: determining a plurality of sets of cell configurations, each set of cell configurations including one cell configuration for each cell; determining an overall efficiency score for each set of cell configurations based on the efficiency score of each cell configuration in that set of cell configurations; and selecting a set of cell configurations with the highest overall efficiency score as the target cell configuration for each cell.

In some embodiments, determining the efficiency score for each cell configuration may involve: determining an input state of at least one cell upstream of a cell corresponding to that cell configuration; and determining the efficiency score for that cell configuration based on the input state.

In some embodiments, determining the efficiency score for each cell configuration may involve: determining an input state of at least one cell downstream of a cell corresponding to that cell configuration; and determining the efficiency score for that cell configuration based on the input state.

In some embodiments, determining the efficiency score for each cell configuration may involve: determining a production level of the manufacturing assembly line when that cell configuration is applied to a corresponding cell; and determining the efficiency score for that cell configuration based on the production level.

In some embodiments, determining the efficiency score for that cell configuration may be based on whether the production level meets a predetermined production quota.

In some embodiments, determining the efficiency score for each cell configuration may involve: determining a defect level of the manufacturing assembly line when that cell configuration is applied to a corresponding cell; and determining the efficiency score for that cell configuration based on the defect level.

In some embodiments, determining the efficiency score for that cell configuration may involve: determining at least one of a rework and a scrap cost based on the defect level; and determining the efficiency score for that cell configuration based on the at least one of the rework and the scrap cost.

In some embodiments, determining the efficiency score for that cell configuration may be further based on whether the defect level meets a predetermined production quota.

In some embodiments, each cell may include at least one devices configured to process the workpiece. Each cell configuration may involve at least one device configuration corresponding to a device of a corresponding cell and defining a different process for processing the workpiece by that device. Applying the at least one target cell configuration may involve implementing each corresponding device configuration at a corresponding device.

In accordance with some embodiments, there is provided a non-transitory computer-readable medium including instructions executable on a processor for implementing the method.

In accordance with some embodiments, there is provided a system for optimizing a manufacturing assembly line. The manufacturing assembly line includes a plurality of cells. Each cell is configured to successively process a workpiece along the manufacturing assembly line. The system includes a processor configured to: receive cell data associated with at least one cell of the manufacturing assembly line, the cell data including, for each cell, at least one input state of that cell and a cell position of that cell within the manufacturing assembly line; extract feature data from the cell data, the feature data including at least one input state and at least one cell position of at least one cell; determine a plurality of cell configurations, each cell configuration corresponding to one cell and defining a different process for processing the workpiece by that one cell; determine an efficiency score for each cell configuration by applying the extracted feature data to a predictive model generated for predicting a production level of the manufacturing assembly line; determine at least one target cell configuration from the plurality of cell configurations based on the efficiency score for each cell configuration; and apply the at least one target cell configuration to at least one cell by implementing each target cell configuration to a corresponding cell.

In some embodiments, the processor may be further configured to determine a plurality of cell configurations for one cell; and determine one target cell configuration for that one cell by selecting a cell configuration with the highest efficiency score from the plurality of cell configurations for that one cell.

In some embodiments, the processor may be further configured to determine at least one cell configuration for each cell; and determine a target cell configuration for each cell.

In some embodiments, the processor may be further configured to: determine a plurality of sets of cell configurations, each set of cell configurations including one cell configuration for each cell; determine an overall efficiency score for each set of cell configurations based on the efficiency score of each cell configuration in that set of cell configurations; and select a set of cell configurations with the highest overall efficiency score as the target cell configuration for each cell.

In some embodiments, the processor may be further configured to: determine an input state of at least one cell upstream of a cell corresponding to that cell configuration; and determine the efficiency score for that cell configuration based on the input state.

In some embodiments, the processor may be further configured to: determine an input state of at least one cell downstream of a cell corresponding to that cell configuration; and determine the efficiency score for that cell configuration based on the input state.

In some embodiments, the processor may be further configured to: determine a production level of the manufacturing assembly line when that cell configuration is applied to a corresponding cell; and determine the efficiency score for that cell configuration based on the production level.

In some embodiments, the processor may be configured to determine the efficiency score for that cell configuration based on whether the production level meets a predetermined production quota.

In some embodiments, the processor may be configured to: determine a defect level of the manufacturing assembly line when that cell configuration is applied to a corresponding cell; and determine the efficiency score for that cell configuration based on the defect level.

In some embodiments, the processor may be further configured to: determine at least one of a rework and a scrap cost based on the defect level; and determine the efficiency score for that cell configuration based on the at least one of the rework and the scrap cost.

In some embodiments, the processor may be further configured to determine the efficiency score for that cell configuration based on whether the defect level meets a predetermined production quota.

In some embodiments, each cell may include at least one devices configured to process the workpiece. Each cell configuration may include at least one device configuration corresponding to a device of a corresponding cell and defining a different process for processing the workpiece by that device. The processor may be configured to implement each corresponding device configuration at a corresponding device.

In accordance with some embodiments, there is provided a method for assessing faults in a manufacturing assembly line. The manufacturing assembly line includes a plurality of cells. Each cell is configured to successively process a workpiece along the manufacturing assembly line. The method involves operating a processor to: receive cell data associated with at least one cell of the manufacturing assembly line, the cell data including, for each cell, at least one input state of that cell and a cell position of that cell within the manufacturing assembly line; extract feature data from the cell data, the feature data including at least one input state and at least one a cell position of at least one cell; determine a plurality of faults, each fault corresponding to one cell; determine a priority level for each fault by applying the extracted feature data to a predictive model; determine at least one high priority fault from the plurality of faults based on the priority level for each fault; and generate at least one operator alert based on the at least one high priority fault.

In some embodiments, determining the plurality of faults may involve determining a plurality of faults for one cell. Determining the at least one high priority fault may involve determining one high priority fault for that one cell by selecting a fault with the highest priority level from the plurality of faults for that one cell.

In some embodiments, determining the plurality of faults may involve determining a plurality of faults for at least two cells, each fault corresponding to one of the at least two cells. Determining the at least one high priority fault may involve determining one high priority fault for one of the at least two cells by selecting a fault with the highest priority level from the plurality of faults for the at least two cells.

In some embodiments, determining the priority level for each fault may involve: determining an input state of at least one cell upstream of a cell corresponding to that fault when that fault occurs at the corresponding cell; and determining the priority level for that fault based on the input state.

In some embodiments, determining the priority level for each fault may involve: determining an input state of at least one cell downstream of a cell corresponding to that fault when that fault occurs at the corresponding cell; and determining the priority level for that fault based on the input state.

In some embodiments, determining the priority level for each fault may involve: determining a production level of the manufacturing assembly line when that fault occurs at a corresponding cell; and determining the priority level for that fault based on the production level.

In some embodiments, determining the priority level for that fault may be based on whether the production level meets a predetermined production quota.

In some embodiments, determining the priority level for each fault may involve: determining a defect level of the manufacturing assembly line when that fault occurs at a corresponding cell; and determining the priority level for that fault based on the defect level.

In some embodiments, determining the priority level for that fault may involve: determining at least one of a rework and a scrap cost based on the defect level; and determining the priority level for that fault based on the at least one of the rework and the scrap cost.

In some embodiments, determining the priority level for that fault is further based on whether the defect level meets a predetermined production quota.

In some embodiments, each cell may include at least one devices configured to process the workpiece. Each fault may include at least one device fault, each device fault corresponding to a device of a cell corresponding to that fault. The at least one operator alert may be generated further based on a device fault corresponding to the at least one high priority fault.

In some embodiments, determining the plurality of faults may involve: determining at least one input state of at least one cell; and determining the plurality of faults based on the at least one input state.

In accordance with some embodiments, there is provided a non-transitory computer-readable medium including instructions executable on a processor for implementing the method.

In accordance with some embodiments, there is provided a system for assessing faults in a manufacturing assembly line. The manufacturing assembly line includes a plurality of cells. Each cell is configured to successively process a workpiece along the manufacturing assembly line. The system includes a processor configured to: receive cell data associated with at least one cell of the manufacturing assembly line, the cell data including, for each cell, at least one input state of that cell and a cell position of that cell within the manufacturing assembly line; extract feature data from the cell data, the feature data including at least one input state and at least one a cell position of at least one cell; determine a plurality of faults, each fault corresponding to one cell; determine a priority level for each fault by applying the extracted feature data to a predictive model; determine at least one high priority fault from the plurality of faults based on the priority level for each fault; and generate at least one operator alert based on the at least one high priority fault.

In some embodiments, the processor may be configured to determine a plurality of faults for one cell; and determine one high priority fault for that one cell by selecting a fault with the highest priority level from the plurality of faults for that one cell.

In some embodiments, the process may be configured to determine a plurality of faults for at least two cells, each fault corresponding to one of the at least two cells; and determine one high priority fault for one of the at least two cells by selecting a fault with the highest priority level from the plurality of faults for the at least two cells.

In some embodiments, the processor may be configured to: determine an input state of at least one cell upstream of a cell corresponding to that fault when that fault occurs at the corresponding cell; and determine the priority level for that fault based on the input state.

In some embodiments, the processor may be configured to: determine an input state of at least one cell downstream of a cell corresponding to that fault when that fault occurs at the corresponding cell; and determine the priority level for that fault based on the input state.

In some embodiments, the processor may be configured to: determine a production level of the manufacturing assembly line when that fault occurs at a corresponding cell; and determine the priority level for that fault based on the production level.

In some embodiments, the processor may be configured to determine the priority level for that fault based on whether the production level meets a predetermined production quota.

In some embodiments, the processor may be configured to: determine a defect level of the manufacturing assembly line when that fault occurs at a corresponding cell; and determine the priority level for that fault based on the defect level.

In some embodiments, the processor may be configured to: determine at least one of a rework and a scrap cost based on the defect level; and determine the priority level for that fault based on the at least one of the rework and the scrap cost.

In some embodiments, the processor may be further configured to determine the priority level for that fault based on whether the defect level meets a predetermined production quota.

In some embodiments, each cell may include at least one devices configured to process the workpiece. Each fault may include at least one device fault, each device fault corresponding to a device of a cell corresponding to that fault. The processor may be configured to generate the at least one operator alert based on a device fault corresponding to the at least one high priority fault.

In some embodiments, the processor may be configured to: determine at least one input state of at least one cell; and determine the plurality of faults based on the at least one input state.

BRIEF DESCRIPTION OF THE DRAWINGS

Several embodiments will be described in detail with reference to the drawings, in which.

Figure 1:
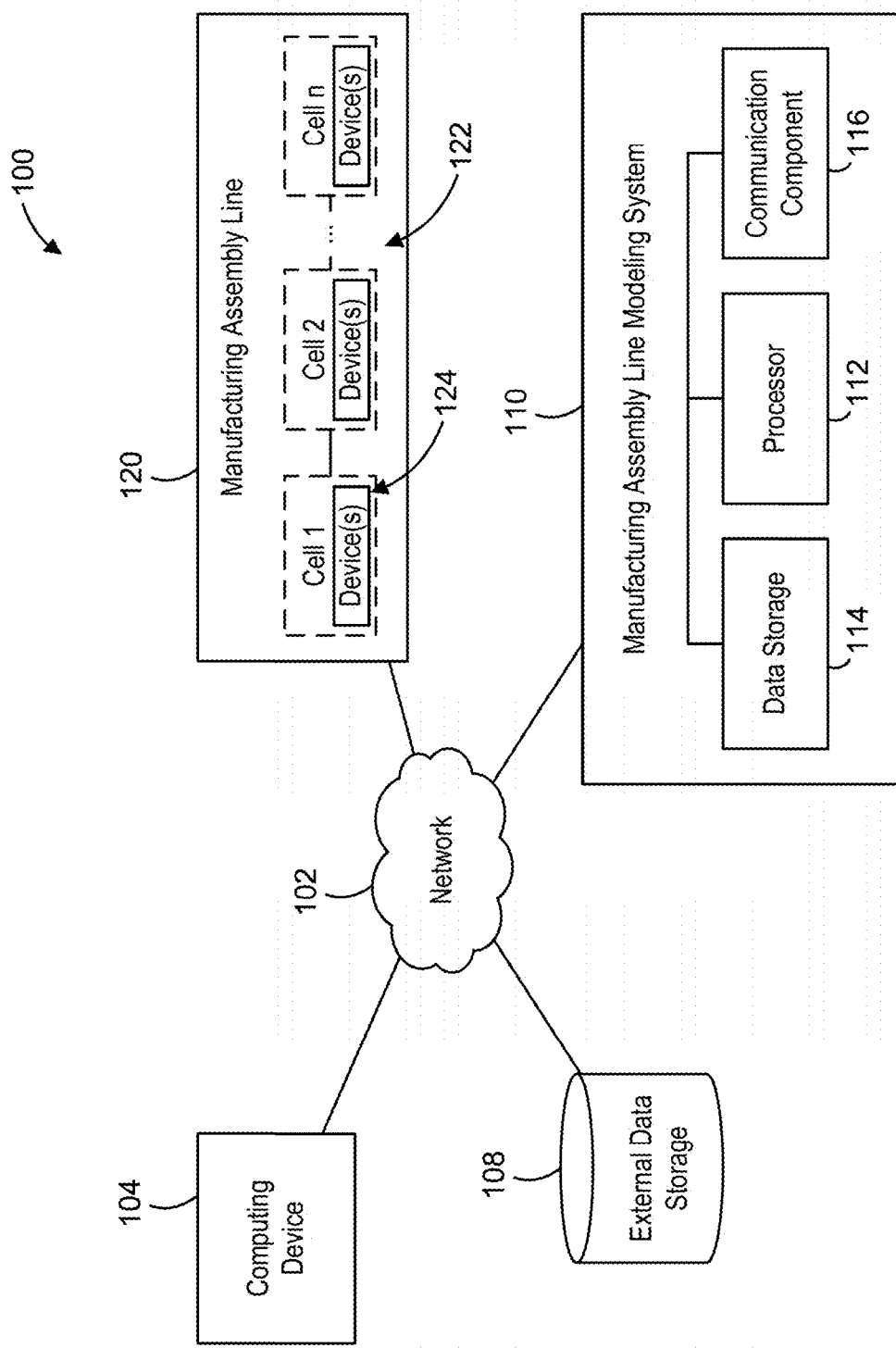
FIG. 1 is a block diagram of an example modeling system in communication with an example manufacturing assembly line, in accordance with some embodiments.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Modern manufacturing assembly lines can involve a large number of highly configurable machines that can produce complex final products. For example, manufacturing assembly lines configured to produce complex products such as medical devices, electronics, or automobiles, may involve more than hundreds, if not thousands, of processing steps. To increase the efficiency of the manufacturing process, manufacturing assembly lines may be organized into a number of subsections or stations, which may be referred to as cells. Each cell can include a collection of one or more related devices for processing a workpiece.

It may be difficult to predict the behavior a manufacturing assembly line, even if it is organized into one or more cells. Despite a simplified cellular arrangement, a manufacturing assembly line may nevertheless exhibit highly complex, interdependent, and convoluted properties. Traditionally, understanding the behavior of a manufacturing assembly line typically involves relying on the intuition or "gut-feel" of expert operators who have significant experience dealing with a particular manufacturing assembly line. However, this may be unreliable when changes to the manufacturing assembly line are implemented. Furthermore, no such expert operators may be available when implementing a new manufacturing assembly line.

For example, the production level of a manufacturing assembly line may be dependent on a large number of factors, including, but not limited to, the configuration of the cells. Changing the configuration of one cell may affect the efficiency of one or more other cells or even the entire manufacturing assembly line. These interdependencies may make it difficult to determine an optimal configuration for the manufacturing assembly line. Furthermore, when problems inevitably arise in the manufacturing assembly line, it can be difficult to evaluate which faults should be remedied first. For example, it may be unclear which faults are critical to the operation of the manufacturing assembly line.

Moreover, it can also be difficult to understand how the quality of parts produced by the manufacturing assembly line are affected by these factors. Complex part routing, incoming components, environment, and other variables may all impact the quality of the production.

The systems and methods described herein can involve modeling the behavior of a manufacturing assembly line.

For example, some embodiments described herein may involve predicting the production level of a manufacturing assembly line.

The systems and methods described herein may use artificial intelligence or machine learning methods to train (i.e., generate or build) models for predicting one or more properties of a manufacturing assembly line. For example, some embodiments described herein may involve receiving various data associated with a manufacturing assembly line, identifying data relevant to the operation of the manufacturing assembly line, and training a model using the relevant data. The systems and methods described herein may generate models that do not rely on explicit instructions or programming. Instead, the described systems and methods may generate models that utilize patterns or inferences determined from training data.

The systems and methods described can also involve using trained models for various purposes. For example, the trained models may be used to predict a production level of a manufacturing assembly line based on cell data associated with cells in that manufacturing assembly line. In some embodiments, the trained models may be used to optimize the efficiency of a manufacturing assembly line. For example, the trained models may be used to determine the efficiency of various configurations to identify a target configuration. In some embodiments, the trained models may be used to evaluate faults in the manufacturing assembly line. For example, the trained models may be used to determine faults that should be prioritized to be addressed.

Reference is first made to FIG. 1, which illustrates an example block diagram 100 of a modeling system 110 in communication with a manufacturing assembly line 120, an external data storage 108, and a computing device 104 via a network 102. Although only one manufacturing assembly line 120 and one computing device 104 are shown in FIG. 1, the modeling system 110 can be in communication with a greater number of manufacturing assembly lines 120 and/or computing devices 104. The modeling system 110 can communicate with the manufacturing assembly line(s) 120 and computing device(s) 104 over a wide geographic area via the network 102.

The modeling system 110 includes a processor 112, a data storage 114, and a communication component 116. The modeling system 110 can be implemented with more than one computer server distributed over a wide geographic area and connected via the network 102. The processor 112, the data storage 114 and the communication component 116 may be combined into a fewer number of components or may be separated into further components.

The processor 112 can be implemented with any suitable processor, controller, digital signal processor, graphics processing unit, application specific integrated circuits (ASICs), and/or field programmable gate arrays (FPGAs) that can provide sufficient processing power for the configuration, purposes and requirements of the modeling system 110. The processor 112 can include more than one processor with each processor being configured to perform different dedicated tasks.

The communication component 116 can include any interface that enables the modeling system 110 to communicate with various devices and other systems. For example, the communication component 116 can receive cell data generated by the manufacturing assembly line 120 and store the cell data in the data storage 114 or the external data storage 108. The processor 112 can then use the cell data to train a predictive model according to the methods described herein.

The communication component 116 can include at least one of a serial port, a parallel port or a USB port, in some embodiments. The communication component 116 may also include an interface to component via one or more of an Internet, Local Area Network (LAN), Ethernet, Firewire, modem, fiber, or digital subscriber line connection. Various combinations of these elements may be incorporated within the communication component 116. For example, the communication component 116 may receive input from various input devices, such as a mouse, a keyboard, a touch screen, a thumbwheel, a track-pad, a track-ball, a card-reader, voice recognition software and the like depending on the requirements and implementation of the modeling system 110.

The data storage 114 can include RAM, ROM, one or more hard drives, one or more flash drives or some other suitable data storage elements such as disk drives. The data storage 114 can include one or more databases for storing data related to the manufacturing assembly line 120, such as cell data, device data, and line production data. The data storage 114 may also store various data related to models trained by the modeling system 110.

In some embodiments, the data storage 114 can be used to store an operating system and programs. For instance, the operating system provides various basic operational processes for the processor 112. The programs may include various user programs so that a user can interact with the processor 112 to perform various functions such as, but not limited to, viewing and/or manipulating the stored data, models, as well as retrieving and/or transmitting data.

The external data storage 108 can store data similar to that of the data storage 114. The external data storage 108 can, in some embodiments, be used to store data that is less frequently used and/or older data. In some embodiments, the external data storage 108 can be a third party data storage stored with cell, device, or line production data for analysis by the modeling system 110. The data stored in the external data storage 108 can be retrieved by the computing device 104 and/or the modeling system 110 via the network 102.

The computing device 104 can include any device capable of communicating with other devices through a network such as the network 102. A network device can couple to the network 102 through a wired or wireless connection. The computing device 104 can include a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

The network 102 can include any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the modeling system 110, the manufacturing assembly line 120, the external data storage 108, and the computing device 104.

The manufacturing assembly line 120 can be any type of assembly line for manufacturing any type of product. For example, the manufacturing assembly line 120 may be configured to manufacture food or beverage, textile, computer or electronic, vehicle, chemical, medical, or other products. The manufacturing assembly line 120 may perform discrete manufacturing processes to produce discrete products or perform process manufacturing processes to produce bulk or undifferentiated products. The particular arrangement and configuration of the manufacturing assembly line 120 may depend on the type of the product being manufactured.

The manufacturing assembly line 120 can include one or more cells 122. Each cell 122 may be a subsection or station of the manufacturing assembly line 120 that is configured to perform a specific processing task on a workpiece. During operation, a workpiece can travel along the manufacturing assembly line 120 from cell 122 (e.g., Cell 1) to cell 122 (e.g., Cell 2). Each cell 122 can progressively process the workpiece until a final product is produced.

Each cell 122 can include one or more devices 124 for processing a workpiece. The processing tasks performed by the devices 124 of a particular cell 122 can be related to each other. For example, the devices 124 of a particular cell 122 may perform sub-steps or sub-processes in the overall processing task accomplished by the cell 122. The devices 124 for a particular cell 122 can, in some embodiments, be physically located proximate to each other. For example, the devices 124 for a particular cell 122 may be housed within a common chassis or share a common power supply.

Figure 2A:
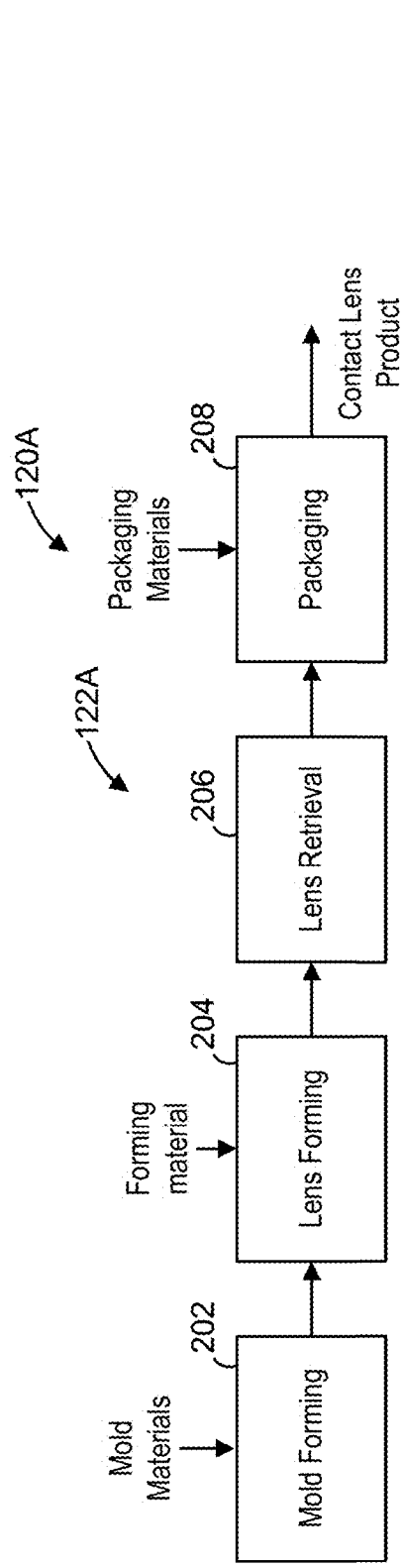
FIG. 2A is a block diagram of an example manufacturing assembly line for manufacturing contact lenses.
Figure 2B:
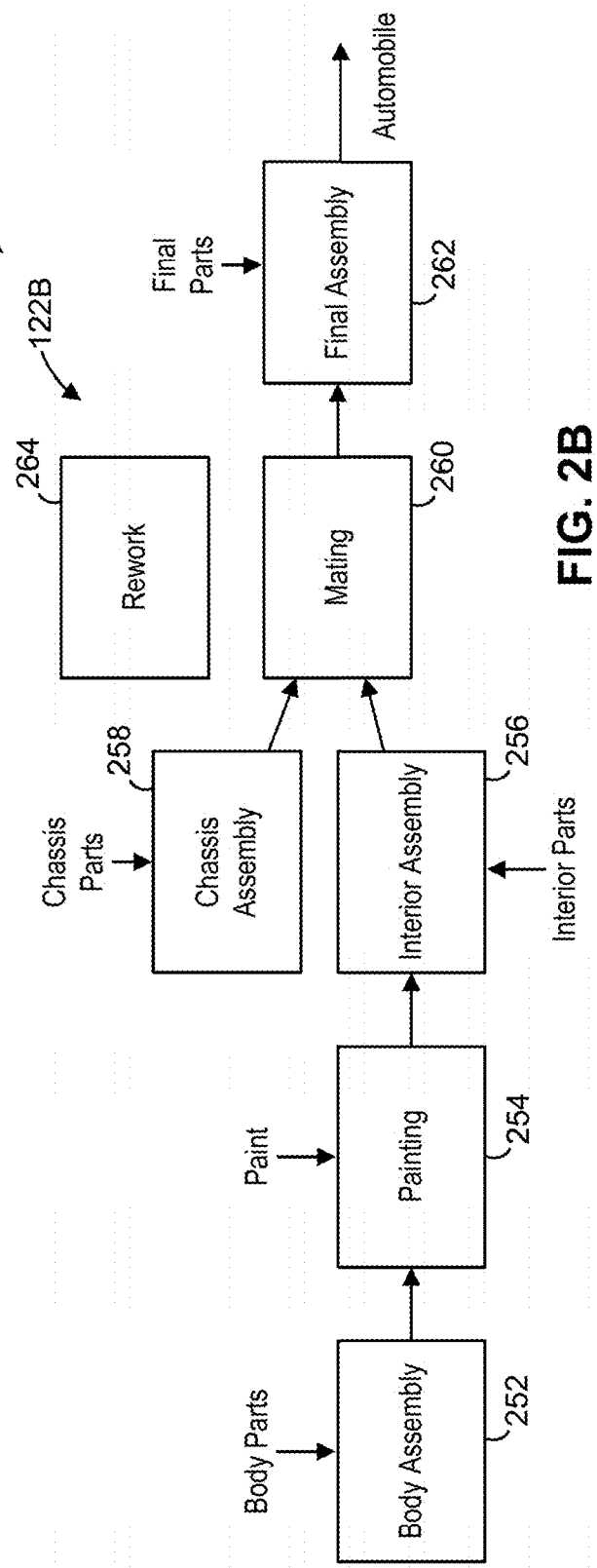
FIG. 2B is a block diagram of an example manufacturing assembly line for manufacturing automobiles.

The cells 122 can be positioned and connected in various arrangements to form the manufacturing assembly line 120. For example, the cells 122 can be arranged in a linear fashion, in which the manufacturing assembly line 120 is formed by a single line of connected cells 122 (e.g., as illustrated in FIGS. 1 and 2A). In some embodiments, the cells 122 can be arranged in a non-linear manner. For example, the manufacturing assembly line 120 may be formed by two or more parallel lines of connected cells 122, which may or may not be connected (e.g., as illustrated in FIG. 2B).

Various types of data can be captured from the manufacturing assembly line 120 and used by the modeling system 110. For example, data associated with cells 122, the devices 124, or the productivity of the manufacturing assembly line 120 may be collected or sampled. The captured data may be stored in the manufacturing assembly line 120, the computing device 104, the external data storage 108 and/or the data storage 114. The stored data may be formatted in various ways, such as, but not limited to, tensors, arrays, and the like. As will be described in greater detail with reference to FIG. 3-6, the captured data can be retrieved by the modeling system 110 and used to train a model or used with a trained model to make predictions regarding the manufacturing assembly line 120.

The data captured from the manufacturing assembly line 120 can include data associated with one or more cells 122, which may be referred herein as cell data. The cell data may include data related to the position of one or more cells 122 within the manufacturing assembly line 120. The cell data may define the position of one or more cells 122 relative to one or more other cells 122. For example, a cell position may specify that a particular cell 122 is upstream or downstream of one or more other cells 122 (e.g., ahead or behind in the manufacturing assembly line 120). In some embodiments, the cell data may define one or more cell positions absolutely within the manufacturing assembly line 120. For example, in a linear arrangement, each cell may be assigned a numerical cell position (e.g., 1 for the first cell, 2 for the second cell, etc.).

The cell data may also include data related to the state of one or more cells 122 during the operation of the manufacturing assembly line 120. The state of a particular cell 122 can specify the status or condition of that cell 122. For example, a cell state may indicate that a particular cell 122 is running normally, running but experiencing a fault, not running all together, etc. A cell state may also identify the input state of a particular cell 122. For example, the input state may specify that a particular cell 122 is starved or underfed (e.g., when that cell 122 has not received one or more inputs required for that cell 122 to process the workspace) or overfed (e.g., where that cell 122 has received an oversupply of one or more inputs).

The cell data may also include data related to the cell configuration for one or more cells 122. A cell configuration may define various parameters or settings that define the processing task performed by that cell 122 on a workpiece. For example, the cell configuration may define the type of processing, the length of the processing, etc.

The data captured from the manufacturing assembly line 120 can also include data associated with one or more devices 124 of the cells 122, which may be referred herein as device data. Similar to the cell data, the device data can include data related to the state of one or more devices 124 during the operation of the manufacturing assembly line 120, such as, whether a particular device is running normally, experiencing a fault, not running, starved, overfed, etc. However, in contrast with the cell data, the device data may include data that has a higher degree of granularity. For example, the device data may include data related to the speed, cycle time, temperature, humidity, etc. of one or more devices 124. The device data may also include data related to the device configuration for one or more devices 124, defining various parameters of settings for the processing completed by those devices 124.

The data captured from the manufacturing assembly line 120 can also include data associated with the productivity of the manufacturing assembly line 120 during operation, which may be referred herein as line production data. The line production data may include data regarding the overall production level of the manufacturing assembly line 120. For example, the line production data can define the number of finished products produced by the manufacturing assembly line 120 in a given period of time. The line production data may also include data indicating the production level of a particular portion of the manufacturing assembly line 120. For example, the line production data can define the number of processed workpieces produced by one or more cells 122 or one or more devices 124 in a given period of time. The line production data may also include data related to the defect level or quality level of the manufacturing assembly line 120 (or a portion thereof). For example, the line production data may define the number of defective products produced by the line, a particular cell 122, or a particular device 124, in a given period of time.

The captured data may include datasets that are collected over a period of time. For example, the data may include timestamps corresponding to when a particular data point was sampled or measured. For example, the data may include cell data that represents the state of one or more cells 122 at various points in time. Similarly, the data may also include line production data that represents the production level of the manufacturing assembly line 120 (or cell 122 or device 124) at various time points. Likewise, the data may also include device data that represents the state of one or more devices 124 at different times. The data may include different types of data that have the same timestamp (e.g., correspond to the same, or approximately the same, time.

For example, the data may include a cell state corresponding to a particular time, and a production level corresponding to the same time.

In some embodiments, the captured data may data that is received from one or more external sources (i.e., external from the manufacturing assembly line 120). For example, the data may include subcomponent assembly information, environmental factors, supplier information, material composition data, facility information, ERP and transaction information, shipping data, component packaging data, and the like.

In various embodiments, the captured data may include buffering time, buffering levels, warehousing locations and times, manufacturing tool or device information (e.g., machining toolsets, mold toolsets, or any tools or devices used to manufacture or assemble the product), quality data (e.g., vision images, part videos, measurements, part dimensions, part tolerances, part performance characteristics, etc.), and the like.

The data captured from the manufacturing assembly line 120 may be generated by the manufacturing assembly line 120 itself (and/or by the cells 122 and/or the devices 124). For example, the manufacturing assembly line 120 may include various sensors (not shown) configured to measure various properties of the manufacturing assembly line 120. In some embodiments, the data may be generated by an external device, such as the computing device 104, configured to monitor the manufacturing assembly line 120. In some cases, a human operator may inspect one or more portions of the manufacturing assembly line 120, and electronically input the data into the computer device 104, the manufacturing assembly line 120, or the modeling system 110.

Different types of data associated with the manufacturing assembly line 120 may be captured at different sampling rates. For example, data associated with the cells 122 may be captured every 200 milliseconds, whereas data associated with the devices may be captured every 50 milliseconds. The data may be sampled in a manner such that different types of data can be temporally aligned. For example, some types of data may be sampled at a relatively higher rate than other types of data so that at least some of the oversampled data will correspond to the same (or approximately the same) time as data captured at a lower sampling rate. Oversampling data to temporally align the data may provide more accurate data points than merely interpolating data sampled at lower sampling rates or other similar methods.

Two examples of a manufacturing assembly line 120 will be now be described with reference to FIGS. 2A and 2B.

FIG. 2A shows a block diagram of an example manufacturing assembly line 120A for manufacturing contact lens. The manufacturing assembly line 120A can include a number of cells 122A, such as, but not limited to, a mold forming cell 202, a lens forming cell 204, a lens retrieval cell 206, and a packaging cell 208. Each of the cells 122A can include one or more devices, which are omitted from FIG. 2A for ease of illustration and exposition.

The mold forming cell 202 can produce molds for shaping the contact lenses. The mold forming cell 202 can receive mold materials and create the molds from the mold materials. The mold forming cell 202 can also receive used molds from the lens retrieval cell 206. The mold forming cell 202 can include various devices for melting the mold materials, filling the molds, processing the molds, inspecting the formed molds etc. The mold production cell 202 can send the finished molds to the lens forming cell 204.

The lens forming cell 204 can receive forming material, as well as the molds from the mold forming cell 202, and produce lenses from the forming material using the molds. The lens forming cell 204 can include various devices for dispensing the forming material, aligning the molds, closing the molds, curing the forming material, etc. The lens forming cell 204 can send the finished lenses (attached to the molds) to the lens retrieval cell 206.

The lens retrieval cell 206 can receive the lenses and molds from the lens forming cell 204 and prepare the lens for packaging. The lens retrieval cell 206 can include various devices for mold processing, removing the lenses, hydrating the lenses, inspecting the lenses, etc. The lens retrieval cell 206 can send the lenses to the packaging cell 208 and send the molds to the mold forming cell 202.

The packaging cell 208 can receive packaging materials, as well as the lenses from the lens retrieval cell 206, and package the lenses using the packaging materials. The packaging cell 208 can include various devices for packaging the lenses, filing the packaging with saline, sealing the packaging, labeling the packaging, sterilizing the packaging, inspecting the packaging, etc. The packaging cell 208 can output a final packaged contact lens product from the manufacturing assembly line 120A.

FIG. 2B shows a block diagram of an example manufacturing assembly line 120B for manufacturing automobiles. The manufacturing assembly line 120B can include a number of cells 122A, such as, but not limited to, a body assembly cell 252, a painting cell 254, an interior assembly cell 256, a chassis assembly cell 258, a mating cell 260, a final assembly cell 262, and a rework cell 264. Each of the cells 122B can include one or more devices, which are omitted from FIG. 2B for ease of illustration and exposition.

The body assembly cell 252 can create the body, or exterior shell of an automobile. The body assembly cell 252 receives parts for the body, such as panels and braces, and assembles the parts into a body. The body assembly cell 252 can include various devices for positioning parts, welding parts, inspecting the body, etc. The body assembly cell 252 can send the assembled body to the painting cell 254.

The painting cell 254 can receive paint, as well as the body from the body assembly cell 252, and apply the paint to the body. The painting cell 254 can include various devices for cleaning the body, priming the body, dispensing paint onto the body, curing the paint, inspecting the painted body, etc. The painting cell can send the painted body to the interior assembly cell 256.

The interior assembly cell 256 can build the interior of the vehicle, such as the dashboard, seats, etc. The interior assembly cell 256 can receive parts for the interior, as well as the painted body from the painting cell 254, and assemble the interior. The interior assembly cell 256 can include various devices for positioning parts, assembling the parts, inspecting the assembled parts, etc. The interior assembly cell 256 can send the assembled body to the mating cell 260.

The chassis assembly cell 258 can build the chassis, or structural frame of the automobile, and the powertrain. The chassis assembly cell 258 can receive parts, such as beams and rails and assemble the parts into the chassis. The chassis assembly cell 258 can also receive parts, such as the engine or transmission, and assemble the parts into the power train. The chassis assembly cell 258 can include various devices for positioning parts, welding parts, inspecting the chassis, etc. The chassis assembly cell 258 can send the assembled chassis to the mating cell 260. The chassis assembly cell 258 may operate in parallel to the body assemble cell 252, the painting cell 254, and the interior assembly cell 256.

The mating cell 260 can receive the chassis from the chassis assembly cell 258, and the body from the interior assembly cell 256 and fix the two assemblies together. The mating cell 260 can include various devices for positioning the body/chassis, welding the body/chassis, inspecting the final assembly, etc. The mating cell 260 can then send the assembly to the final assembly cell 262.

The final assembly cell 262 can add various parts to the received assembly to finalize the automobile, such as batteries, tires, etc. The final assembly cell receives the final parts, as well as the body and chassis assembly from the mating cell 260, and installs the final parts into the assembly. The final assembly cell 262 can include various devices for installing the final parts, inspecting the automobile, etc. The final assembly cell 262 can output the finished automobile from the manufacturing assembly line 120B.

Optionally, the manufacturing assembly line 120B may include a rework cell 264 that can receive an unfinished assembly (i.e., a workpiece) from any other cell 122B in the manufacturing assembly line 120B. The rework cell 264 can include various devices for fixing any defects in the processing performed by any other cell 122B. In some embodiments, the manufacturing assembly line 120B may send defective workpieces back to the cell responsible for the defect to be reworked.

As shown in FIGS. 2A and 2B, different manufacturing assembly lines 120A, 120B can have different arrangements and configurations, depending on the type of product produced. For example, contact lenses may require relatively low cost and simple processing to manufacture. Accordingly, a linear arrangement may be suitable. In contrast, an automobile may require relatively higher cost and more complex processing. As a result, an automobile may require non-linear arrangement, for example, for reworking defective workpieces.

The example manufacturing assembly lines 120A and 120B will now be used to illustrate various examples of the operation of the modeling system 110.

Figure 3:
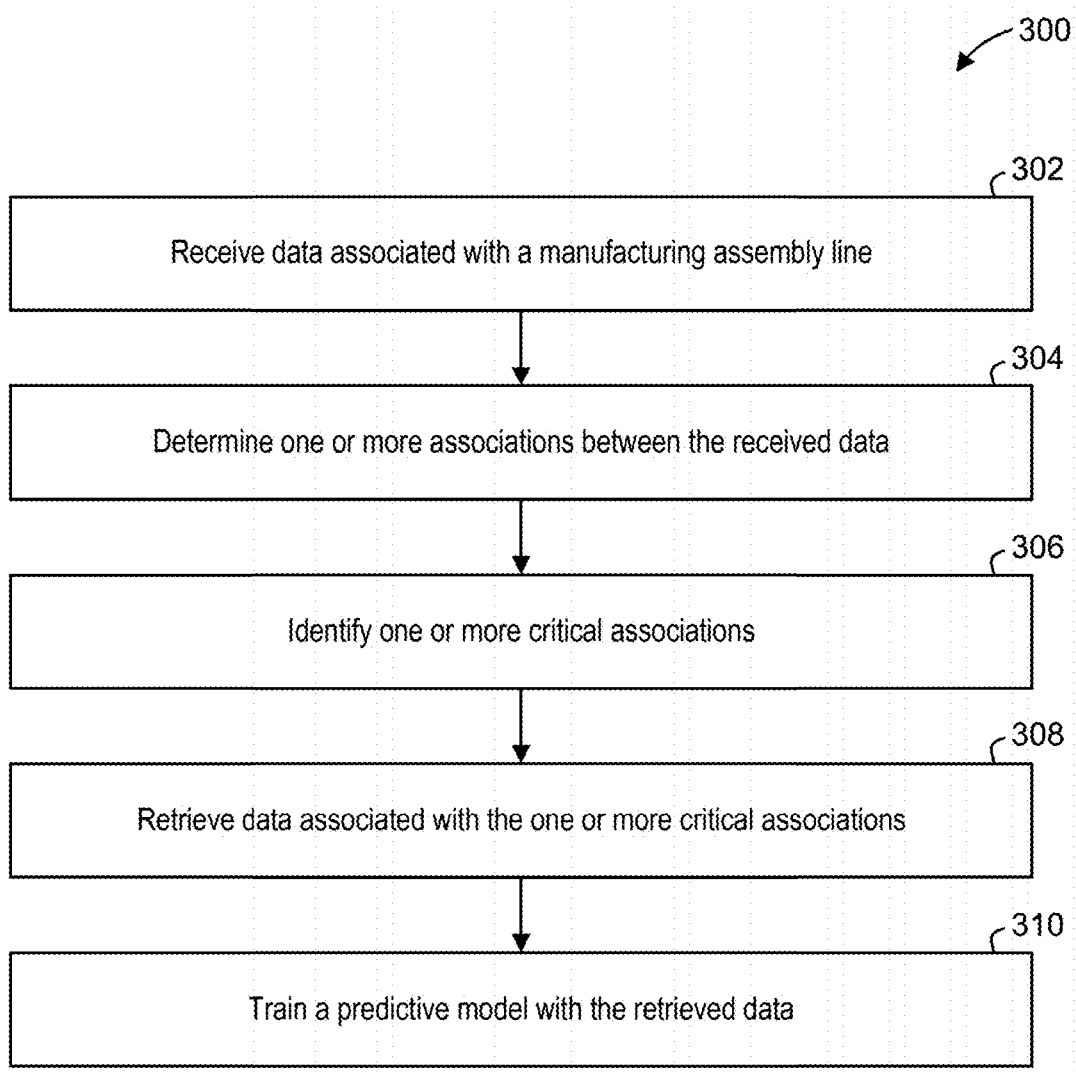
FIG. 3 is a flowchart of an example method of operating the modeling system of FIG. 1 to train a model, in accordance with some embodiments.

Reference is now made to FIG. 3, which shows a flowchart of an example method 300 of operating the modeling system 110. The method 300 can be implemented by the modeling system 110 to train a predictive model to predict one or more properties of a manufacturing assembly line 120.

At 302, the processor 112 can receive data associated with a manufacturing assembly line 120. The processor 112 can receive the data from various sources and in various formats. For example, the processor 112 may receive the data from the data storage 114, the external data storage 108, the computing device 104, and/or the manufacturing assembly line 120. The processor 112 can receive various data associated with the cells 122, the devices 124, and/or the productivity of the manufacturing assembly line 120 (e.g., the productivity level or product quality level).

For example, continuing with the example of the manufacturing assembly line 120A, the processor 112 may receive cell data that includes one or more input states of each cell 122A (e.g., the mold forming cell 202, the lens forming cell 204, the lens retrieval cell 206, and the packaging cell 208) and the positions of the cells 122A within the manufacturing assembly line 120A. The processor 112 may also receive production data that includes one or more production levels of the manufacturing assembly line 120A. The processor 112 may also receive production data that includes the product quality level of the parts being produced by the manufacturing assembly line 120A.

The data received by the processor 112 may include subsets of data that correspond to each other. Some of the received data may be associated with the same (or approximately the same) point in time. For example, for the manufacturing assembly line 120A, the received data may include the input state of one or more cells 122 at a particular time and a production level at the same time.

At 304, the processor 112 can determine one or more associations between the received data. The one or more associations may define potential or suspected relationships, connections, or correspondences between portions of the data. The associations may define possible correlations or causal relationships between portions of the cell data, the device data, and/or the line production data. For example, the associations may include but are not limited to, associations between cell states and production levels, associations between cell positions and production levels, associations between device states and production levels, associations between cell states and other cell states, associations between device states and cells states, etc.

For example, continuing with the example of the manufacturing assembly line 120A, the associations may include one or more production associations between data associated with one or more cells 122A and a production level of the manufacturing assembly line 120A or a product quality level of the manufacturing assembly line 120A.

The associations may include associations between data that correspond to the same (or approximately the same) time. For example, the associations may include an association between cell data and a production level sampled at the same (or approximately the same) time. The associations may also include associations between data that correspond to different times. For example, the associations may include an association between cell data corresponding to a first time and a production level corresponding to a second time later than the first time.

The associations may also include multiple associations corresponding to the same data. For example, the associations may include an association between a first cell state and a particular production level, and an association between a second cell state and the same production level. In another example, the associations may include an association between a particular cell state and a first production level and the same cell state and a second production level.

At 306, the processor 112 can determine one or more critical associations to the operation of the manufacturing assembly line 120. It should be appreciated that not all of the identified associations identified at 304 may define relationships relevant to the overall production level of the manufacturing assembly line 120. The processor 112 can evaluate each of the associations to identify the critical associations. The processor 112 can evaluate the one or more associations in various ways.

For example, continuing with the example of the manufacturing assembly line 120A, the input state of some of the cells 122A may be more relevant to the production level of the manufacturing assembly line 120A. For instance, input state of the mold forming cell 202 may have a larger impact on production than the packaging cell 208, because a delay in the mold forming cell 202 may delay one or more downstream cells. The processor 112 may therefore identify an association between an input state of the mold forming cell 202 and a production level of the manufacturing assembly line 120A as a critical association.

Figure 7:
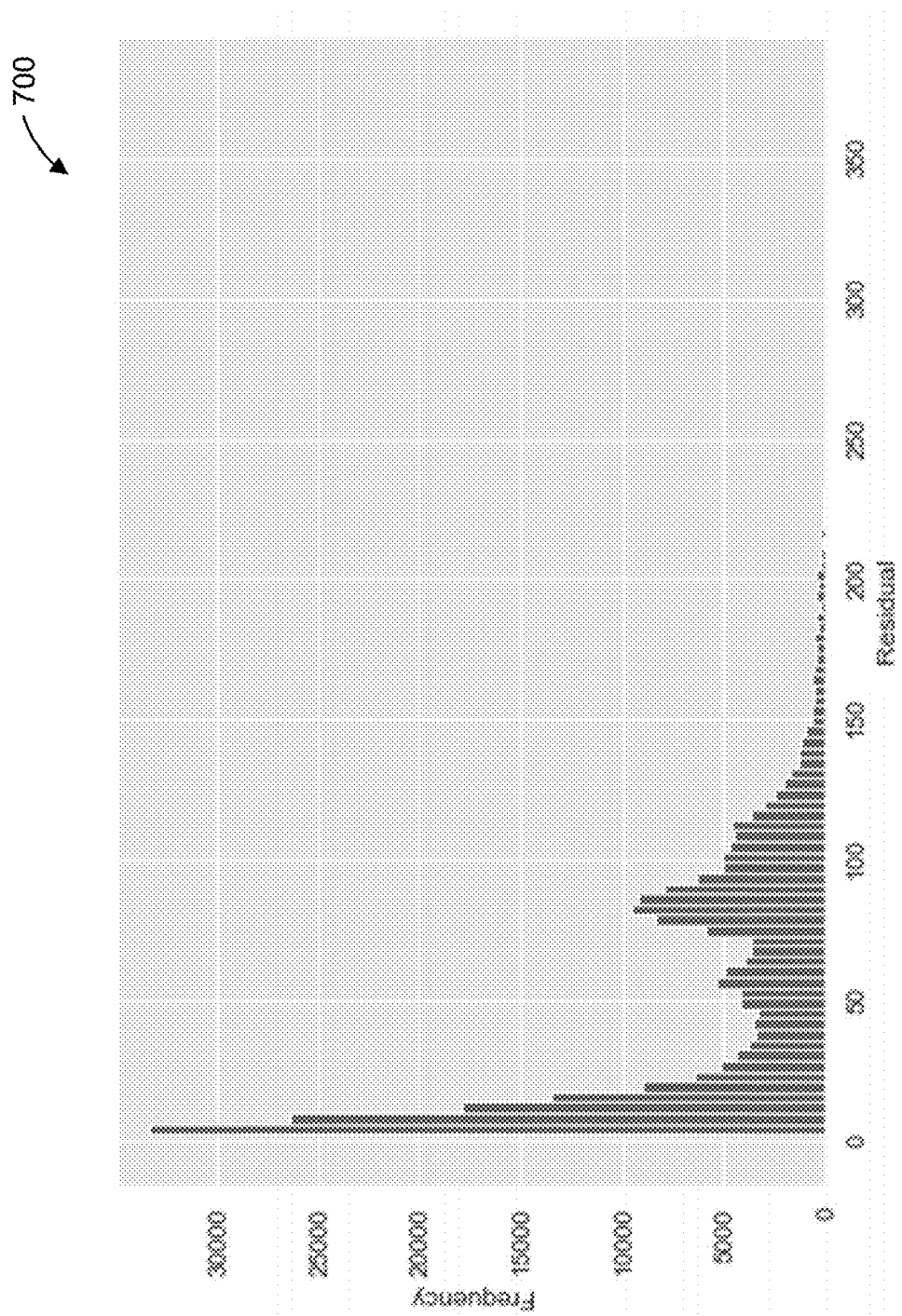
FIG. 7 is a graph illustrating an example residual distribution of associations for a manufacturing assembly line.

In some embodiments, the processor 112 may identify one or more statistically significant associations as the one or more critical associations. The processor 112 may perform various types of statistical testing to determine the statistical significance of the associations. For example, the processor 112 may determine the probability value of each potential association being not actually associated. The processor 112 can then select the associations having a probability value that is less than or equal to a predetermined significance level as the critical associations. Alternatively, the processor 112 may determine the critical associations based on a residual (e.g., difference) between the probability value and the significance level. For example, an example distribution of residuals is shown in FIG. 7 in plot 700. The processor 112 can select the associations having a residual below a predetermined level as the critical associations.

Figure 8:
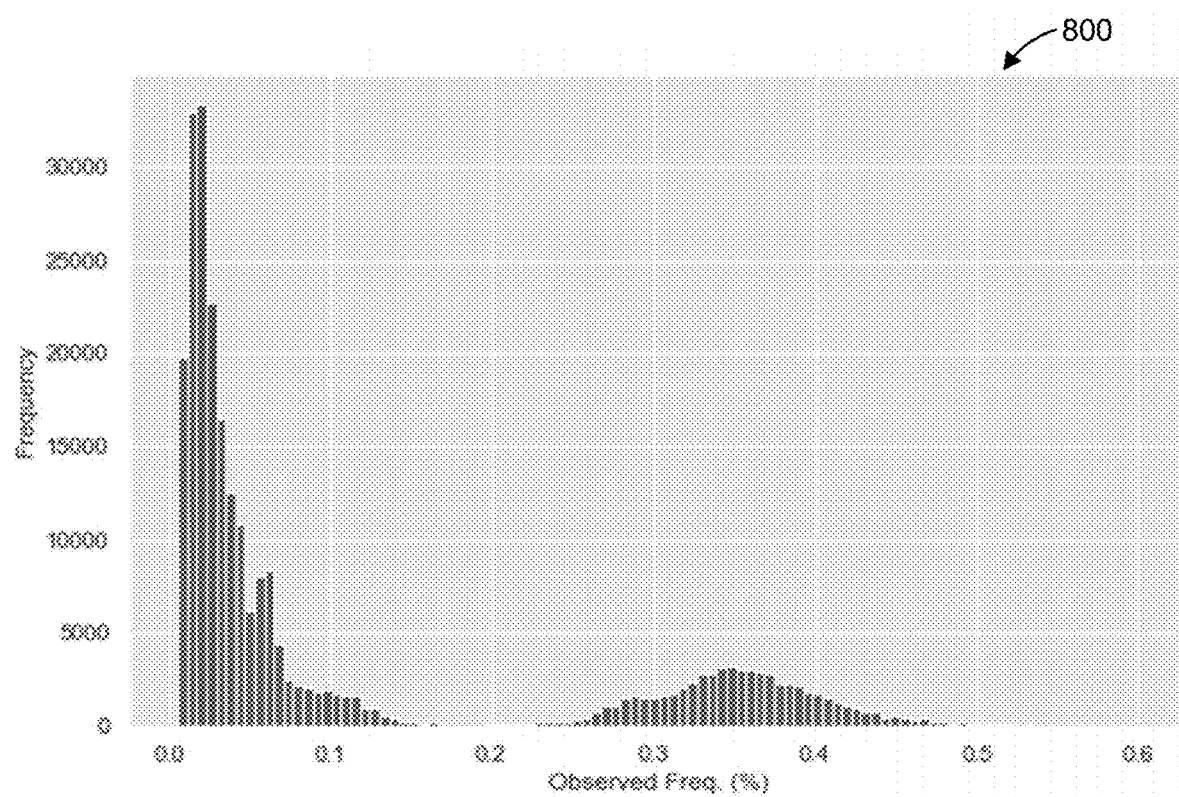
FIG. 8 is a graph illustrating an example frequency distribution of associations for a manufacturing assembly line.
Figure 9:
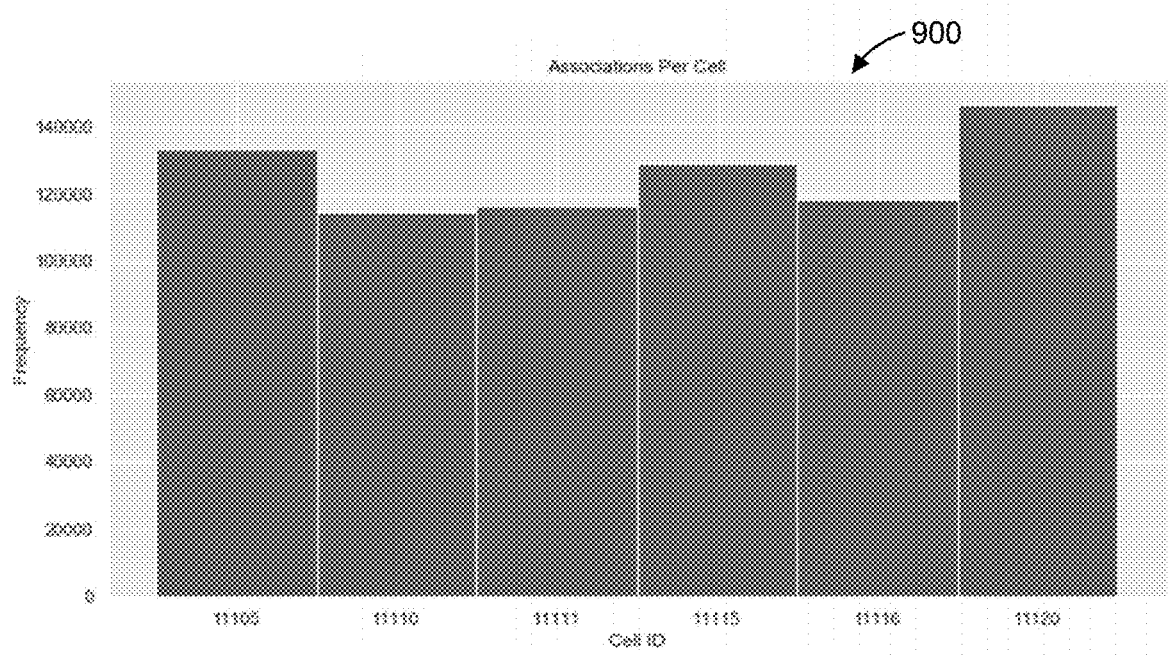
FIG. 9 is a graph illustrating an example frequency distribution of associations by cell for a manufacturing assembly line.

In some embodiments, the processor 112 may determine the one or more critical associations based on the frequency of the associations. For example, continuing with the example of the manufacturing assembly line 120A, each association may correspond to one or more cells 122A. The processor 112 may determine the cells corresponding to the greatest number of associations and select associations corresponding to those cells as the critical associations. For example, an example distribution of association frequency is shown in FIG. 8 in plot 800. An example distribution of the cells associated with the highest frequency of associations (e.g., corresponding to the one or more critical associations) is shown in FIG. 9 in plot 900.

Figure 10:
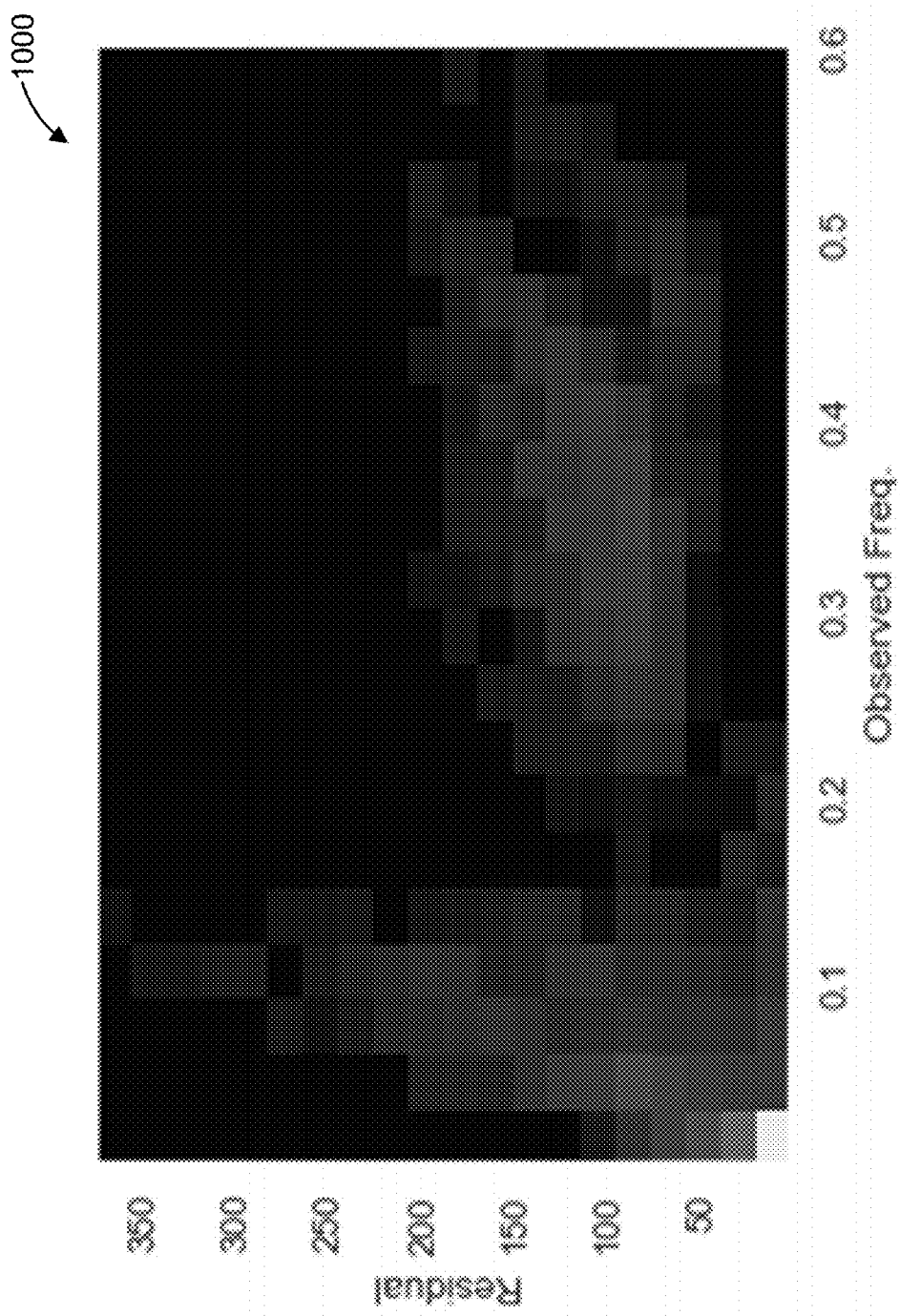
FIG. 10 is a graph illustrating an example frequency and residual distribution of associations for a manufacturing assembly line.

In some embodiments, the processor 112 may determine the one or more critical associations based on both the residuals and the frequency of the associations. For example, an example distribution of residuals and frequency for a set of associations is shown in FIG. 10 in plot 1000. The processor 112 can select the associations having a residual and frequency above a predetermined level as the critical associations.

Figure 11:
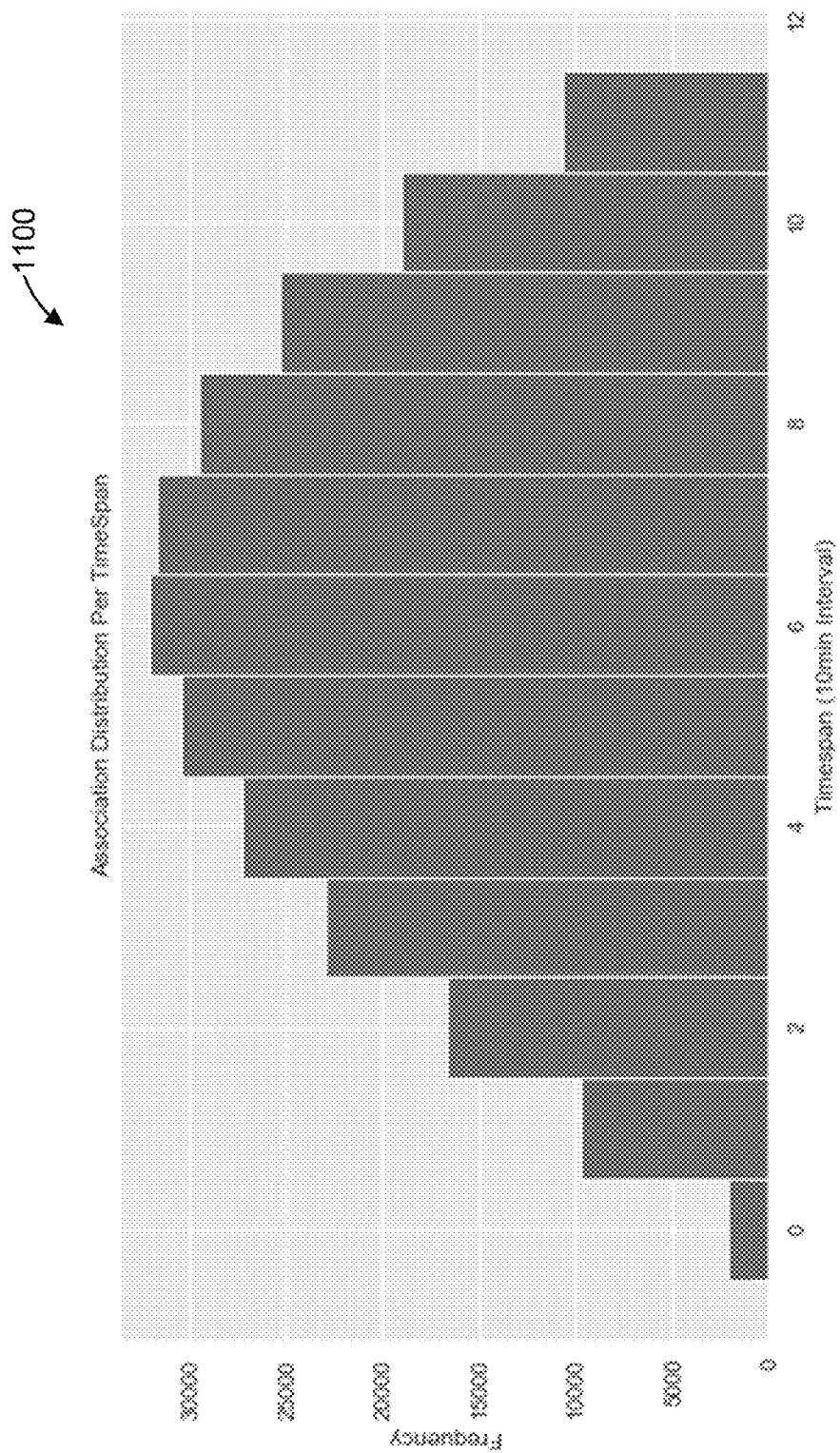
FIG. 11 is a graph illustrating an example timespan distribution of associations for a manufacturing assembly line.

In some embodiments, the processor 112 may identify the one or more critical associations based on the timestamps of the data corresponding to the associations. For example, for an association between a cell state corresponding to a first time and a production level corresponding to a second time, the processor 112 may determine the difference in time (if any) between the first and second times. The processor 112 may determine that the association is critical association based on whether the time difference exceeds a pre-determined time period. An example distribution of associations based on timespan is shown in FIG. 11 as plot 1100. As shown in plot 1100, the distribution of associations greatly decreases at approximately 2 hours.

At 308, the processor 112 can retrieve the data associated with the critical associations. The processor 112 may not retrieve all of the data received by the processor 112 at 302, depending on the critical associations. For example, continuing with the example of the manufacturing assembly line 120A, the processor 112 may retrieve data associated with the mold forming cell 202, but not data associated with the packaging cell 208, in accordance with the critical associations. The processor 112 may retrieve the relevant data from the data storage 114, the external data storage 108, the computing device 104, and/or the manufacturing assembly line 120.

At 310, the processor 112 can train a model with the retrieved data to predict one or more properties of a manufacturing assembly line 120. Training the model can involve the processor 112 generating or building a predictive model based on the retrieved data. It should be appreciated that various types of training may be performed by the processor 112. For example, the processor 112 may employ supervised learning, unsupervised learning, semi-supervised learning, reinforcement learning, and/or other training techniques. The training can generate models based on patterns and inferences detected from the training data, instead of explicitly programing or instructing the model to make specific predictions. The processor 112 may train various types of models, such as, but not limited to, neural networks, Bayesian networks, decision trees, support vector machines, regression analyses, genetic algorithms, random forest, LK-means, deep learning, anomaly detection and root cause analysis. In various embodiments, regression models may be preferred. In various embodiments, the trained model may be updated using various features or tensors. That is, as new data points (e.g., tensors) become available to the system, the trained models can be updated using the new data.

The trained model can then be used to predict one or more properties of a manufacturing assembly line 120. The inputs and outputs of the trained model can depend on the data used to train the model. For example, continuing with the example of the manufacturing assembly line 120A, the model may be trained to predict the production level of the manufacturing assembly line 120A based on the input states and positions of the cells 122A, using training data from the manufacturing assembly line 120A, which can include cell input states, cell positions, and associated production levels. As another example, the model may be used to predict the quality level of the parts produced by the manufacturing assembly line 120A based on the input states and positions of the cells 122A.

Figure 4:
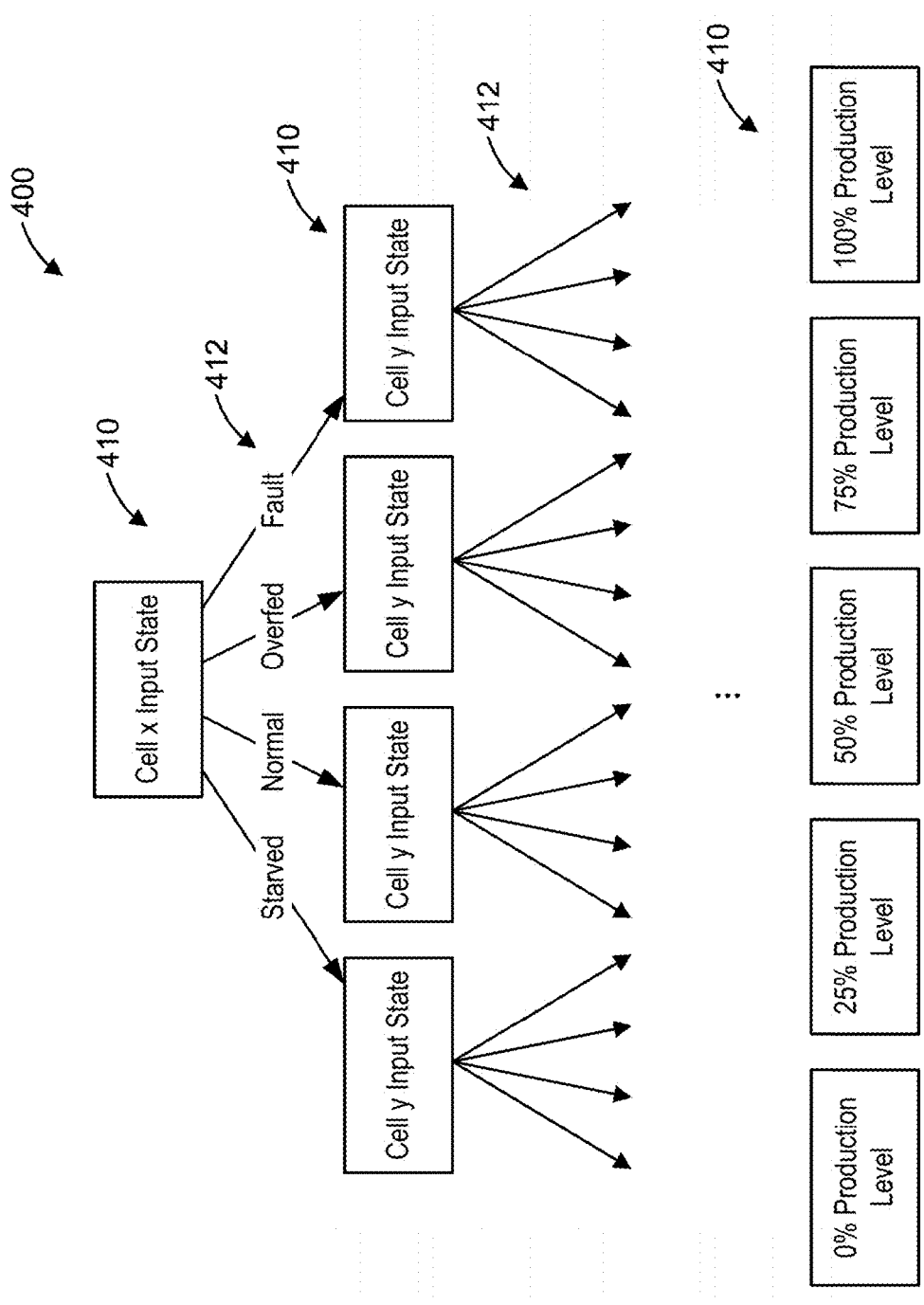
FIG. 4 is an graphical representation of an example model trained by the operating the modeling system of FIG. 1.

Referring now to FIG. 4, there is shown an example predictive model 400. The predictive model 400 illustrated in FIG. 4 is structured as a decision tree model generated by the modeling system 110 in accordance with the method 300. It will be understood that other structures for the predictive model 400 can be applied.

The decision tree model 400 can include a number of nodes 410 and a number of branches 412 connected to the nodes 410. Some of the nodes 410 can represent a test for a particular property of a manufacturing assembly line 120. For example, continuing with the example of the manufacturing assembly line 120A, a node 410 may represent a determination of an input state of the mold forming cell 202. The branches 412 connected to that node 410 can represent an outcome following node 410. For example, the branches can represent various states, such as, but not limited to, "starved", "stuffed", and "normal". Some of the nodes 410 can represent a prediction or a decision. For example, a node may represent various production levels, such as "100% production level", "75% production level", etc. The nodes 410 can correspond to the data used to train the model 400. For example, some of the nodes 410 may correspond to the one or more critical associations.

The modeling system 110 can then apply the predictive model 400 to other manufacturing assembly lines 120 to predict one or more properties of the manufacturing assembly line.

Figure 12:
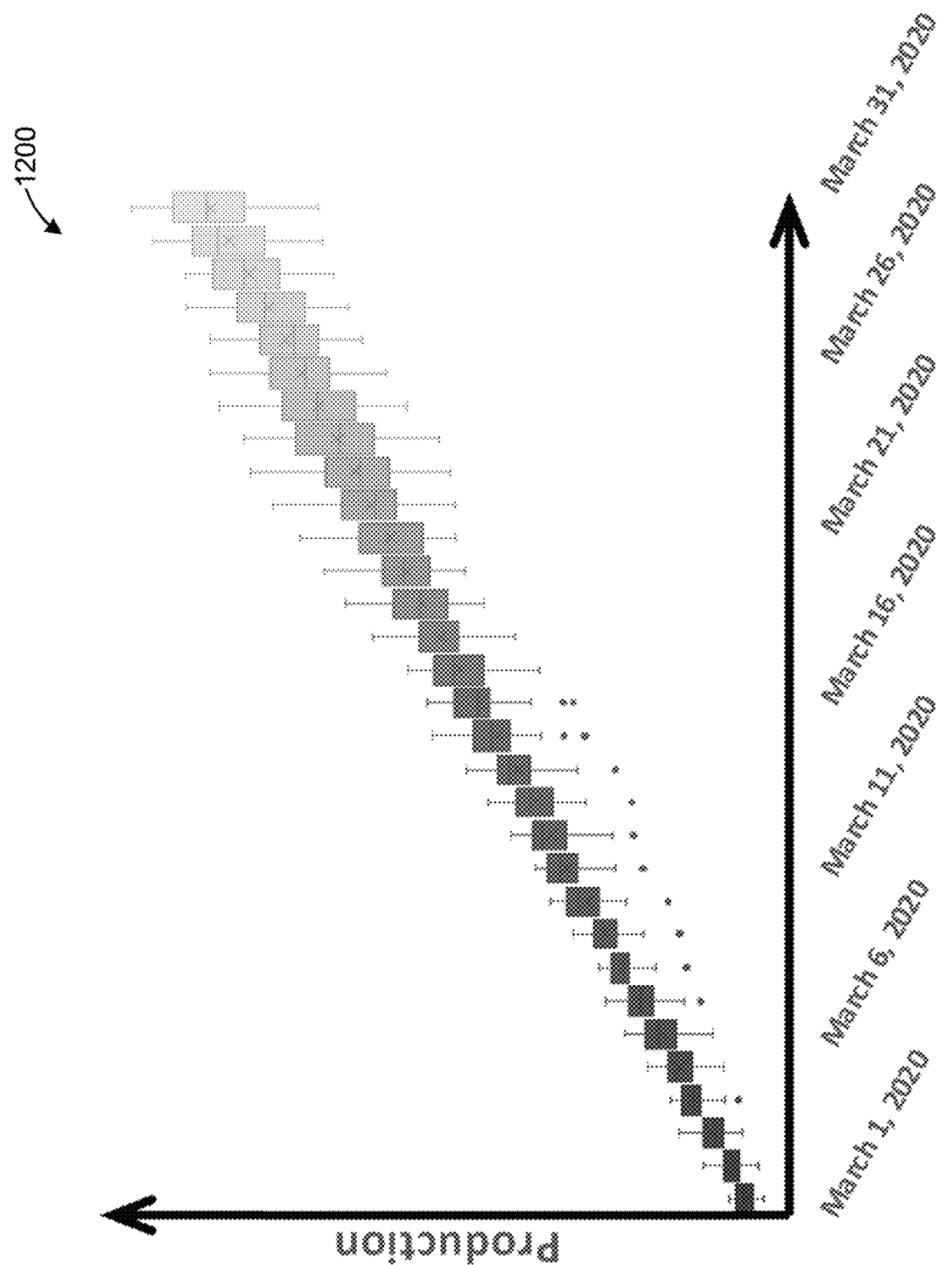
FIG. 12 is a graph illustrating an example predicted production level over time of a manufacturing assembly line.

Referring now to FIG. 12, an example output of a trained model is shown as plot 900. More specifically, plot 900 shows a predicted production level of a manufacturing assembly line 120 over time. As shown in FIG. 9, the accuracy of the predictions generated by the predictive model may vary over time. For example, the accuracy of the predicted production level may decrease over time, as the time span of the prediction increases.

It should be appreciated that the modeling system 110 may produce various types of models. For example, the modeling system 110 may train a model to predict the input states of one or more cells 122 based on the input states of one or more other cells 122. In some embodiments, the modeling system 110 may train a model to predict the input states of one or more cells 122 based on the device states of one or more devices 124. In another example embodiment, the modeling system 110 may train a model to predict the productivity level of a manufacturing assembly line 120 based on the configuration of one or more cells 122 or one or more devices 124. In another example embodiment, the modeling system 110 may train a model to predict the defect level of a manufacturing assembly line 120 based on the configuration of one or more cells 122 or one or more devices 124. Accordingly, the modeling system 110 may train various models capable of predicting various properties of a manufacturing assembly line 120, based on various other properties.

In some embodiments, a model may be trained using data associated with a first manufacturing assembly line 120 to predict properties of a second, different manufacturing assembly line 120. The manufacturing assembly line 120 which is used to collect training data may be referred herein as an active manufacturing assembly line or a training manufacturing assembly line. For example, continuing with the examples of the manufacturing assembly lines 120A and 120B, a model may be trained using training data collected from the manufacturing assembly line 120A. The predictive model generated from the training data collected from the manufacturing assembly line 120A may then be used to predict the behavior of the manufacturing assembly line 120B. Although the physical processing performed by two different manufacturing assembly lines may be different (e.g., assembling an automobile, vs synthesizing a contact lens), at least some behavior of the cells 122 in the manufacturing assembly line 120A, 120B may be similar and may therefore be predicted using the predictive model generated from the training data collected from the manufacturing assembly line 120A.

The trained models can be used by the modeling system 110 in various ways, depending on the type of model. For example, a model trained to predict production levels may be used to identify bottlenecks or other inefficiencies in a manufacturing assembly line 120. Various types of root cause analysis or other types of troubleshooting may be used to identify and correct the inefficiencies in the manufacturing assembly line 120 identified by the model. In another example, a model trained to predict production levels may be used to identify underperforming sections of a manufacturing assembly line 120 and that may require maintenance. Various types of predictive maintenance can be performed on these sections to maximize production. As another example, a model trained to predict product quality levels may be used to identify problematic portions of the manufacturing assembly line causing defects in the produced parts.

Two other example methods of using the predictive models will now be described with reference to FIGS. 5 and 6.

Figure 5:
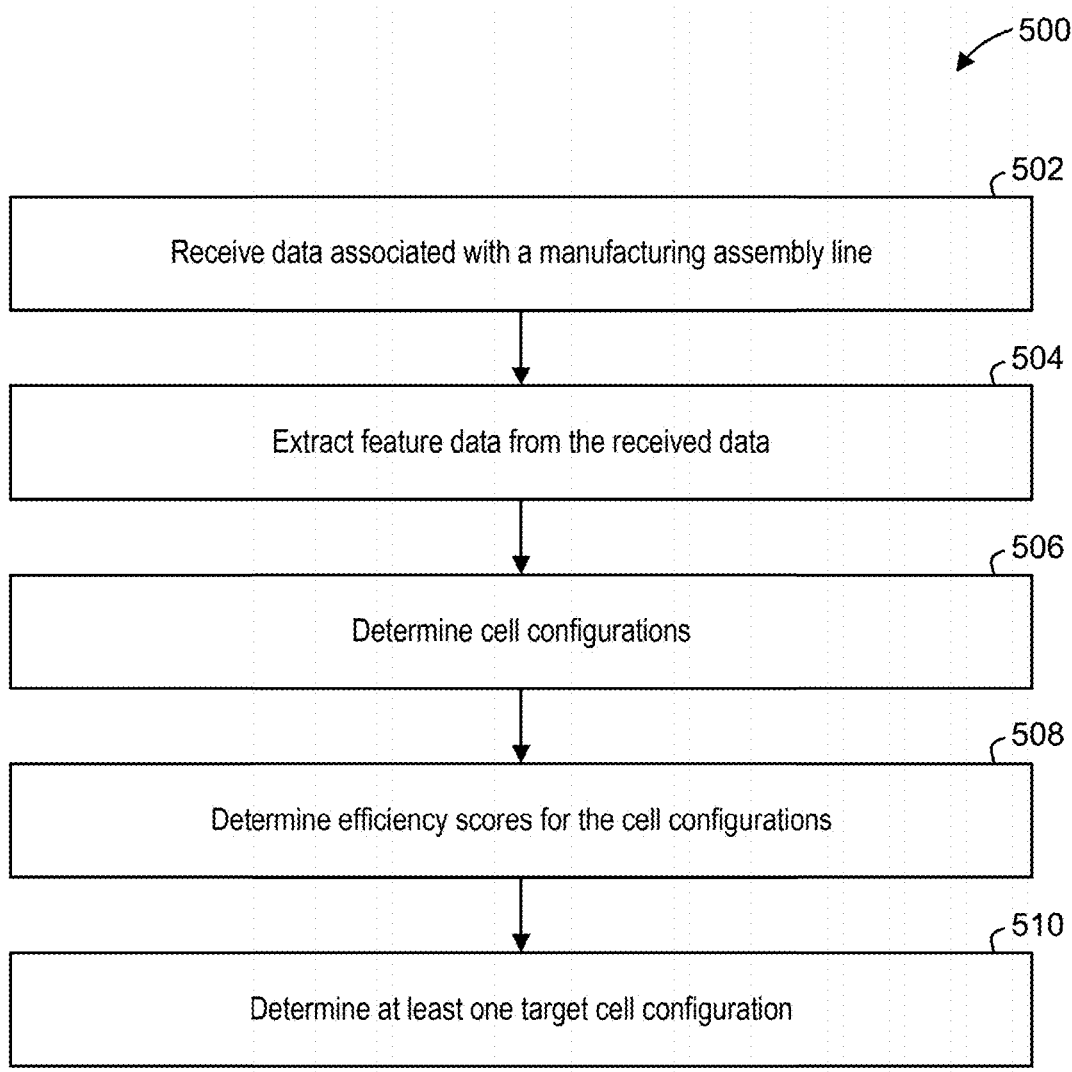
FIG. 5 is a flowchart of another example method of operating the modeling system of FIG. 1 to optimize the configuration of a manufacturing assembly line, in accordance with some embodiments.

FIG. 5 shows a flowchart of another example method 500 of operating the modeling system 110. The method 500 can be implemented by the modeling system 110 to use a predictive model to optimize the configuration of a manufacturing assembly line 120.

At 502, the processor 112 can receive data associated with a manufacturing assembly line 120. The processor 112 can receive various data associated with the cells 122, the devices 124, and/or the productivity of the manufacturing assembly line 120. For example, in the example of the manufacturing assembly line 120A, the processor 112 may receive cell data that includes one or more input states of each cell 122A and the positions of the cells 122A within the manufacturing assembly line 120A.

At 504, the processor 112 can extract feature data from the received data. The data extracted by the processor 112 may depend on the type of predictive model used. The feature data extracted by the processor 112 may correspond to the data used to train the model. For example, if the model was trained using cell input states and cell positions, the processor 112 may extract input states and cell positions as feature data.

At 506, the processor 112 can determine a number of cell configurations. A cell configuration can include various parameters or settings for a cell that modify the processing of a workpiece by that cell. For example, continuing with the example of the manufacturing assembly line 120A, a cell configuration for the mold forming cell 202 may modify the temperature for curing the molds. As another example, a cell configuration for the lens forming cell 204 may modify the amount of forming material dispensed for each lens.

A cell configuration may also include one or more device configurations for the devices of the respective cell. A device configuration can include various parameters or settings for a device that modify the processing of a workpiece by that device. For example, continuing with the example of the manufacturing assembly line 120A, a cell configuration for the lens forming cell 204 may include device configurations for a dispensing device or a mold positioning device of the lens forming cell 204.

The processor 112 can determine the cell configurations in various ways. In some embodiments, the processor may receive cell configurations which the user wishes to evaluate. For example, a user may electronically input the cell configurations into the computing device 104, the manufacturing assembly line 120, and/or the modeling system 110.

The cell configurations determined by the processor 112 may all be for the same cell. In some embodiments, the cell configurations determined by the processor 112 may be for a number of different cells.

At 508, the processor 112 can determine efficiency scores for the cell configurations. The processor 112 can determine the efficiency score of a single cell configuration, or the efficiency score of a set of cell configurations. The efficiency score for a single cell configuration or a set of cell configurations can be determined based on one or more predicted properties of the manufacturing assembly line 120 when that cell configuration or set of cell configurations is implemented. The processor 112 may use the extracted feature data and a predictive model to predict one or more properties.

For example, the processor 112 may use a predictive model to predict a production level of the manufacturing assembly line 120 when one or more cell configurations are implemented. Continuing with the example of the manufacturing assembly line 120A illustrated in FIG. 2A, the predictive model may be used to determine the effect of one or more cell configurations that increase the curing time used by the mold forming cell 202. For example, increasing the curing time may decrease the rate of mold production, which may decrease the production level of the manufacturing assembly line 120A. The processor 112 may assign a relatively low efficiency score to these configurations due to the decrease in production level.

In some embodiments, the processor 112 may use a model to predict a defect level of the manufacturing assembly line 120 when the one or more cell configurations are implemented. Continuing with the example of the manufacturing assembly line 120A, one or more cell configurations that increase the curing time may also decrease the number of defective molds produced that may cause defects in forming the contact lenses, decreasing the overall defect level of the manufacturing assembly line 120A. The processor 112 may assign a relatively high efficiency score to these configurations due to the decrease in defect rate.

The processor 112 may also use the predicted properties to determine whether the manufacturing assembly line 120 will meet a production quota and determine the efficiency score based on whether the production quota will be met. For example, the processor 112 may determine a production level or defect level of the manufacturing assembly line and determine based on the production level or defect level whether the production quota will be met. If the predicted production of the manufacturing assembly line 120 does not meet the production quota, the processor 112 may assign a relatively low efficiency score to these configurations.

In some embodiments, the processor 112 may also use the predicted properties to determine a cost for reworking or scrapping the defective products and determine the efficiency score based on the cost. For example, the processor 112 may determine the number of defective products produced based on a predicted defect rate and determine the cost for reworking or scrapping the defective products. If the rework or scrap cost is relatively high, the processor 112 may assign a relatively low efficiency score to these configurations.

In some embodiments, the efficiency score for a cell configuration or set of cell configurations can be determined based on the predicted input state of another cell 122 when the cell configuration or set of cell configurations is applied. Continuing with the example of the manufacturing assembly line 120A, one or more cell configurations for the lens forming cell 204 may increasing the lens curing time, which may affect the input state of upstream or downstream cells 122A. For example, this may cause the lens retrieval cell 206 or the mold forming cell to become starved. The processor 112 can assign a low efficiency score to these configurations if they negatively affect the input states of other cells 122.

At 510, the processor 112 can determine at least one target cell configuration. The target cell configuration can be determined based on the efficiency scores of the cell configurations.

In some embodiments, the processor 112 can determine a single target cell configuration by identifying a cell configuration associated with the highest efficiency score. For example, continuing with the example of the manufacturing assembly line 120A, the processor 112 can evaluate a number of different configurations for the mold forming cell 202. Each configuration may correspond to a different mold curing time or a different curing temperature, etc. The processor 112 can select the configuration of the mold forming cell 202 with the highest efficiency score as the target cell configuration.

In some embodiments, the processor 112 may determine a set of target cell configurations by identifying a set of cell configurations with the highest efficiency score. For example, continuing with the example of the manufacturing assembly line 120A, each set of configurations can include one configuration for each cell 122A. For instance, each set of cell configuration may define a curing time for the mold forming cell 202, a forming material quantity for the lens forming cell 204, a hydration amount for the lens retrieval cell 206, a sanitation time for the packaging cell 208, etc.

The processor 112 can select the set of configurations with the highest efficiency score as the set of target configurations.

The one or more target cell configurations (or target device configurations) can then be implemented at the corresponding cells (or devices). By selecting the target configurations based on efficiency scores determined using a trained model, the modeling system 110 can determine configurations that may improve the efficiency of the manufacturing assembly line 120.

Figure 6:
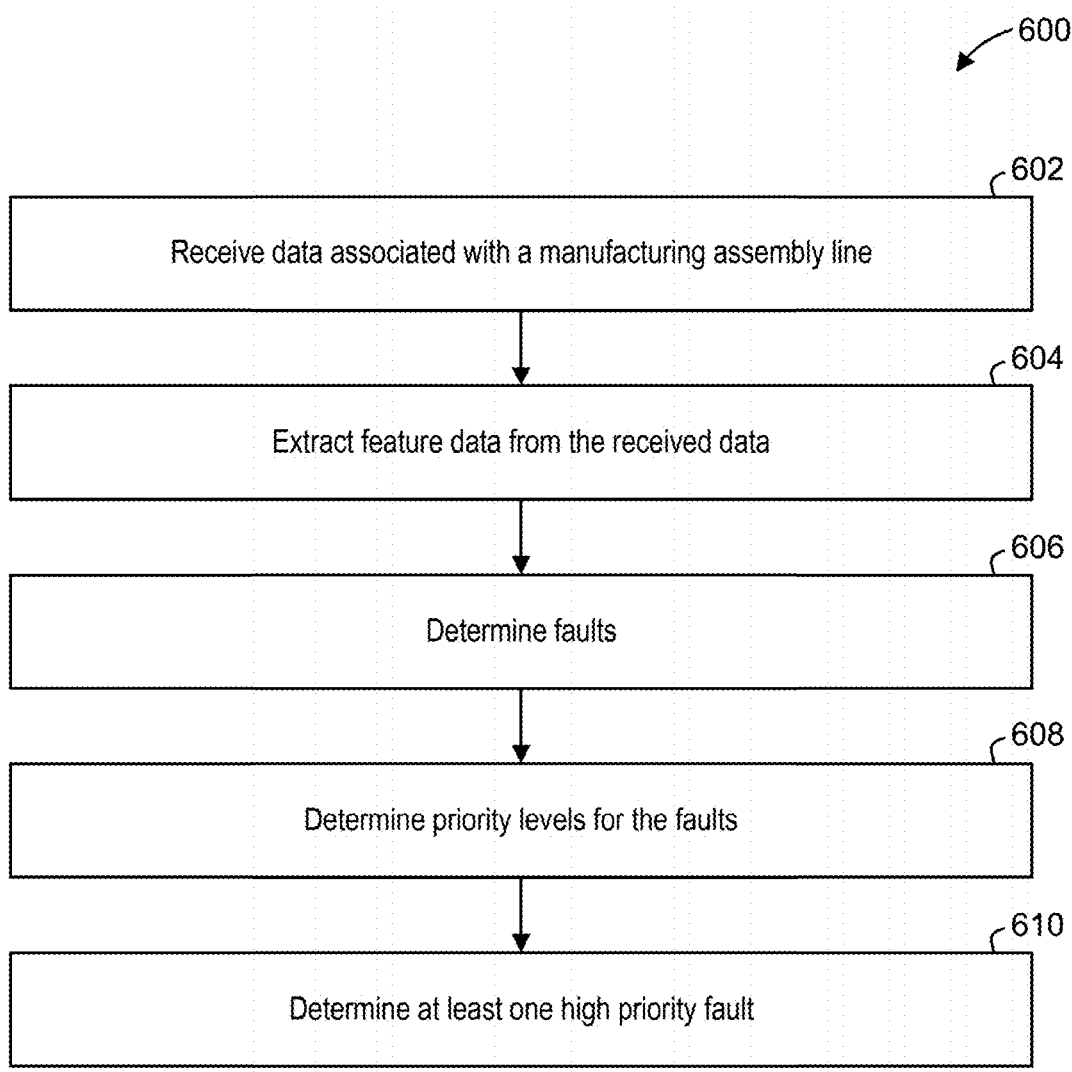
FIG. 6 is a flowchart of another example method of operating the modeling system of FIG. 1 to assess faults in a manufacturing assembly line, in accordance with some embodiments.

Reference is now made to FIG. 6, which shows a flowchart of another example method 600 of operating the modeling system 110. The method 600 can be implemented by the modeling system 110 to use a predictive model to evaluate and prioritize faults at a manufacturing assembly line 120.

At 602, the processor 112 can receive data associated with a manufacturing assembly line 120. The processor 112 can receive various data associated with the cells 122, the devices 124, and/or the productivity of the manufacturing assembly line 120. For example, continuing with the example of the manufacturing assembly line 120A, the processor 112 may receive cell data that includes one or more input states of each cell 122A and the positions of the cells 122A within the manufacturing assembly line 120A.

At 604, the processor 112 can extract feature data from the received data. The data extracted by the processor 112 may depend on the type of predictive model used. The feature data extracted by the processor 112 may correspond to the data used to train the model. For example, if the model was trained using cell input states and cell positions, the processor 112 may extract input states and cell positions as feature data.

At 606, the processor 112 can determine a number of faults. Each fault can correspond to a cell 122 in a manufacturing assembly line 120. A fault may indicate the occurrence of one or more errors, defects, or other failures at the corresponding cell 122. For example, continuing with the example of the manufacturing assembly line 120A, a fault for the mold forming cell 202 may involve a failure in melting or shaping the molding materials. The faults may also correspond to a device for that cell.

The processor 112 may determine the faults based on the input states of the cells. For example, continuing with the example of the manufacturing assembly line 120A, the processor 112 may identify a fault with the mold forming cell 202 when it has an input state of starved. In some embodiments, the processor 112 may determine the faults based on the production level or fault level of the cells 122. For example, continuing with the example of the manufacturing assembly line 120A, the processor 112 may determine that a particular cell 122 is faulted when the production level for that cell 122 is below a predetermined level or when the defect level for that cell 122 is above a predetermined level.

The processor 112 may determine the faults based on the received data. In some embodiments, the processor 112 may determine the faults based on predictions made by a predictive model. For example, the input states, production levels, and/or defect levels may be determined by the processor 112 from the received data or from predictions generated from a trained model using the received data.

The faults determined by the processor 112 may all be for the same cell. In some embodiments, the faults determined by the processor 112 may be for a number of different cells.

At 608, the processor 112 can determine a priority level for the faults. The processor 112 can determine the priority level of a single fault, or the priority level of a set faults. The priority level for a single fault or a set of faults can be determined based on one or more predicted properties of the manufacturing assembly line 120 when that fault or set of faults is occurring. The processor 112 may use the extracted feature data and a predictive model to predict one or more properties.

For example, the processor 112 may use a predictive model to predict a production level of the manufacturing assembly line 120 when one or more faults are occurring. Continuing with the example of the manufacturing assembly line 120A, a predictive model may be used to determine the effect of a malfunctioning heating device of the mold forming cell 202 on the manufacturing assembly line 120A. For example, erroneously decreasing the curing temperature may decrease the rate of mold production, which may decrease the production level of the manufacturing assembly line 120A. The processor 112 may assign a relatively high priority score to these faults due to the decrease in production level.

In some embodiments, the processor 112 may use the predictive model to predict a defect level of the manufacturing assembly line 120 when the one or more faults are occurring. In the example of the manufacturing assembly line 120A, one or more faults that decrease curing temperature may also increase the number of defective molds produced that may cause defects in forming the contact lenses, increasing the defect level of the manufacturing assembly line 120A. The processor 112 may assign a relatively high priority score to these faults due to the increase in defect rate.

The processor 112 may also use the predicted properties to determine whether the manufacturing assembly line 120 will meet a production quota and determine the priority level based on whether the production quota will be met. For example, the processor 112 may determine a production level or defect level of the manufacturing assembly line and determine based on the production level or defect level whether the production quota will be met. If the predicted production of the manufacturing assembly line 120 does not meet the production quota, the processor 112 may assign a relatively high priority level to these faults.

In some embodiments, the processor 112 may also use the predicted properties to determine a cost for reworking or scrapping the defective products and determine the priority level based on the cost. For example, the processor 112 may determine the number of defective products produced based on a predicted defect rate and determine the cost for reworking or scrapping the defective products. If the rework or scrap cost is relatively high, the processor 112 may assign a relatively high priority level to these faults.

In some embodiments, the priority level for a fault or set of faults can be determined based on the predicted input state of another cell when the fault or set faults is occurring. In the example of the manufacturing assembly line 120A, one or more faults for the lens forming cell 204 may increase the lens curing time, which may affect the input state of upstream or downstream cells. For example, this may cause the lens retrieval cell 206 or the mold forming cell to become starved. The processor 112 can assign a high priority level if these faults negatively affect the input states of other cells 122.

At 610, the processor 112 can determine at least one high priority fault. The high priority faults can be determined based on the priority level of the faults.

In some embodiments, the processor 112 can determine a single high priority fault by identifying a fault associated with the highest priority. For example, with respect to the example manufacturing assembly line 120A, the processor 112 can evaluate a number of different faults for the mold forming cell 202. The faults may correspond to different errors on the same device, or different errors across multiple devices for that cell. The processor 112 can select the fault of the mold forming cell 202 with the highest priority as the high priority.

In some embodiments, the processor 112 may determine a set of high priority faults by identifying a set of faults with the highest priority. In the example manufacturing assembly line 120A, each set of faults can include one fault for each cell 122A. For instance, each set of faults may define a curing error for the mold forming cell 202, a dispensing fault for the lens forming cell 204, a hydration failure for the lens retrieval cell 206, a sanitation inconsistency for the packaging cell 208, etc. The processor 112 can identify the set of faults with the highest priority score as the set of high priority faults.

The identified one or more high priority faults can then be used to generate one or more operator alerts. The operator alerts can be electronic messages that are sent to various users in a manufacturing assembly line 120. For example, the operator alerts may be sent to and displayed on the computing device 104 or the manufacturing assembly line 120. The operator alerts can instruct an operator to remedy the identified high priority faults. By identifying high priority faults using the predictive model, the modeling system 110 can evaluate faults with regard to relative priority and remedy the high priority faults.

Figure 13:
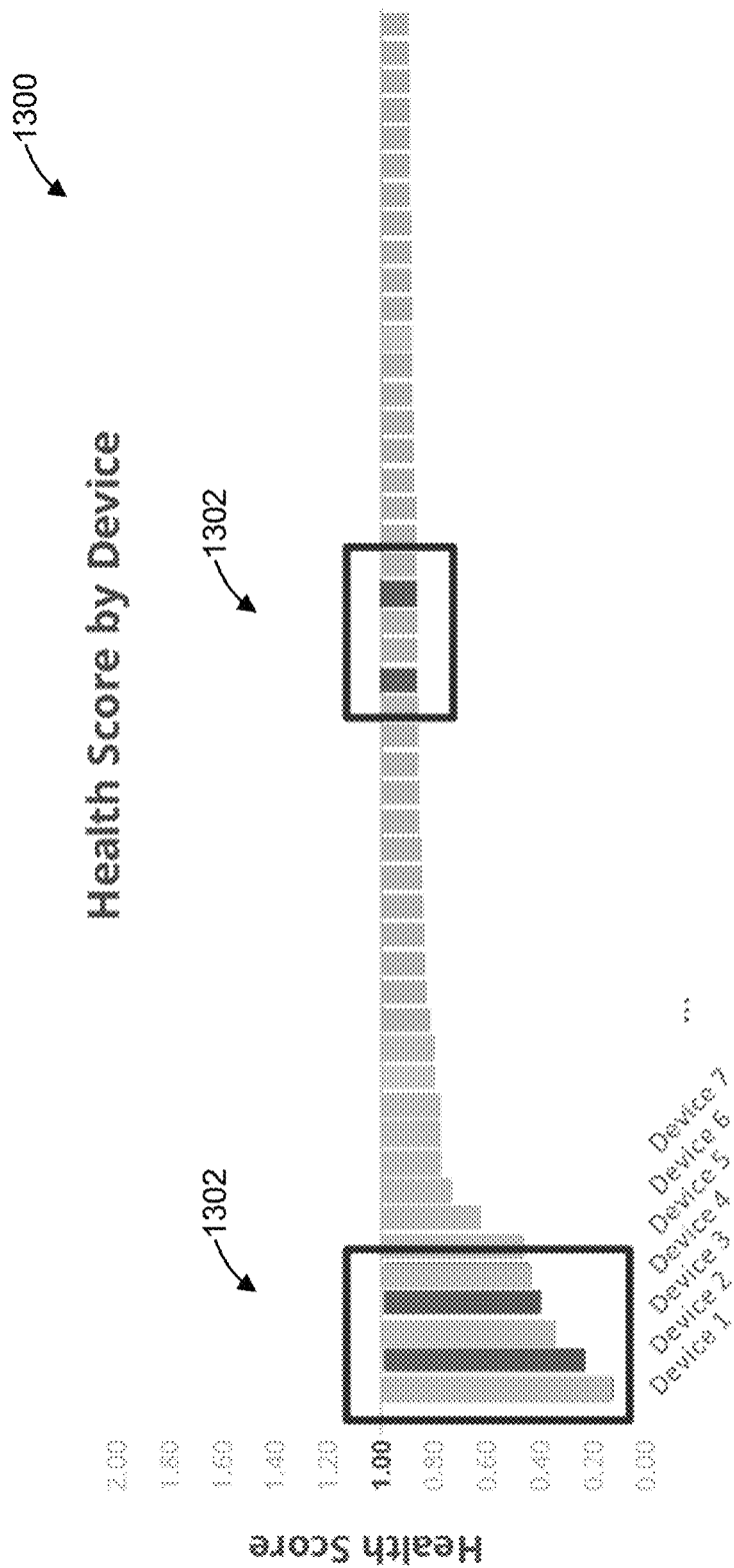
FIG. 13 is a graph illustrating an example health score distribution by device for a manufacturing assembly line.

It should be appreciated that the high priority faults may not be necessarily correspond to the cells 122 with the greatest degree of disrepair or lowest performance. For example, the high priority faults may be faults that have a relatively large effect on the productivity of the manufacturing assembly line 120. For instance, referring to FIG. 13, there is shown a plot 1300 illustrating a distribution of heath scores for various devices 124. A health score may correspond to the performance of a particular device 124. Devices associated by high priority faults are generally indicated in FIG. 13 as 1302. As shown in FIG. 13, the devices 122 corresponding to the lowest health scores may not necessarily correspond to the high priority faults. This may be the case, for example, when some devices with a low health score do not have a large impact on the overall productivity of the manufacturing assembly line 120.

In various embodiments, predictions generated by the predictive models described herein may be accompanied with a causal analysis to determine a causal relationship and provide insights to the predictions, providing a means to improve production of the manufacturing assembly line or behavior of the equipment of the manufacturing assembly line. In various embodiments, the predictive models described herein may predict when a stop event or production event transitions from a minor or insignificant impact to the process to a significant impact to the process or behavior of the equipment. In a production environment, there may be many interruptions and, if resolved in a timely fashion, these interruptions may have a minor or no impact on production. The predictive models described herein may be used to determine the transition from minor to significant impact on production.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

We claim:

1. A method for generating a predictive model for predicting a production level of a manufacturing assembly line comprising at least one cell configured to process a workpiece, the method comprising operating a processor to:
   receive cell data associated with the at least one cell during an operation of an active manufacturing assembly line, the cell data comprising at least one input state of that cell within the active manufacturing assembly line, the at least one input state comprises a starved state in which the corresponding cell received an undersupply of at least one input for processing the workpiece;
   receive line production data associated with the cell data, the line production data being representative of a production level of the active manufacturing assembly line in association with the cell data;
   determine one or more production associations between the cell data and the production level of the active manufacturing assembly line; and
   train the predictive model with the cell data and the line production data associated with at least one production association of the one or more production associations to predict the production level of the manufacturing assembly line.

2. The method of claim 1, wherein the line production data is representative of a defect level of the active manufacturing assembly line, the one or more production associations comprise one or more associations between the cell data and the defect level of the active manufacturing assembly line, and the predictive model is trained to predict the defect level of the manufacturing assembly line.

3. The method of claim 1, wherein the one or more production associations comprises a cell input association between an input state of a cell and the production level of the active manufacturing assembly line, and a cell position association between a cell position of a cell and the production level of the active manufacturing assembly line.

4. The method of claim 1, wherein:
   the cell data comprises a cell position of a first cell relative to a second cell in the active manufacturing assembly line; and
   the one or more production associations comprises a cell position association between the cell position of the first cell relative to the second cell and the production level of the active manufacturing assembly line.

5. The method of claim 4, wherein the first cell is downstream of the second cell in the active manufacturing assembly line.

6. The method of claim 4, wherein the first cell is upstream of the second cell in the active manufacturing assembly line.

7. The method of claim 1, wherein:
at least some of the cell data corresponds to a first time;
at least some of the line production data corresponds to a second time later than the first time; and
the one or more production associations comprises a production association between cell data corresponding to the first time and a production level corresponding to the second time.

8. The method of claim 1, wherein:
the predictive model comprises a decision tree, the decision tree comprising a plurality of nodes; and
training the predictive model comprises generating at least one node corresponding to at least one production association of the one or more production associations.

9. The method of claim 1, wherein:
each cell comprises at least one device configured to process the workpiece;
the method further comprises operating the processor to receive device data associated with the at least one device during the operation of the active manufacturing assembly line, the device data comprising, for each device, at least one device state; and
the one or more production associations comprises an association between the device state and the production level of the active manufacturing assembly line.

10. A system for generating a predictive model for predicting a production level of a manufacturing assembly line comprising at least one cell configured to process a workpiece, the system comprising a processor configured to:
receive cell data associated with the at least one cell during an operation of an active manufacturing assembly line, the cell data comprising at least one input state of that cell within the active manufacturing assembly line, the at least one input state comprises a starved state in which the corresponding cell received an undersupply of at least one input for processing the workpiece;
receive line production data associated with the cell data, the line production data being representative of a production level of the active manufacturing assembly line in association with the cell data;
determine one or more production associations between the cell data and the production level of the active manufacturing assembly line; and
train the predictive model with the cell data and the line production data associated with at least one production association of the one or more production associations to predict the production level of the manufacturing assembly line.

11. The system of claim 10, wherein the line production data is representative of a defect level of the active manufacturing assembly line, the one or more production associations comprise one or more associations between the cell data and the defect level of the active manufacturing assembly line, and the predictive model is trained to predict the defect level of the manufacturing assembly line.

12. The system of claim 10, wherein the one or more production associations comprises a cell input association between an input state of a cell and the production level of the active manufacturing assembly line, and a cell position association between a cell position of a cell and the production level of the active manufacturing assembly line.

13. The system of claim 10, wherein:
the cell data comprises a cell position of a first cell relative to a second cell in the active manufacturing assembly line; and
the one or more production associations comprises a cell position association between the cell position of the first cell relative to the second cell and the production level of the active manufacturing assembly line.

14. The system of claim 13, wherein the first cell is downstream of the second cell in the active manufacturing assembly line.

15. The system of claim 13, wherein the first cell is upstream of the second cell in the active manufacturing assembly line.

16. The system of claim 10, wherein:
at least some of the cell data corresponds to a first time;
at least some of the line production data corresponds to a second time later than the first time; and
the one or more production associations comprises a production association between cell data corresponding to the first time and a production level corresponding to the second time.

17. The system of claim 10, wherein:
the predictive model comprises a decision tree, the decision tree comprising a plurality of nodes; and
the processor is configured to generate at least one node corresponding to at least one production association of the one or more production associations.

18. The system of claim 10, wherein:
each cell comprises at least one device configured to process the workpiece;
the processor is further configured to receive device data associated with the at least one device during the operation of the active manufacturing assembly line, the device data comprising, for each device, at least one device state; and
the one or more production associations comprises an association between the device state and the production level of the active manufacturing assembly line.

* * * * *